US011924143B2

(12) United States Patent
Guo et al.

(10) Patent No.: US 11,924,143 B2
(45) Date of Patent: *Mar. 5, 2024

(54) PHYSICAL RESOURCE BLOCK PRB GRID INDICATION METHOD AND DEVICE

(71) Applicant: Huawei Technologies Co., Ltd., Shenzhen (CN)

(72) Inventors: Zhiheng Guo, Beijing (CN); Qian Wu, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,515

(22) Filed: Nov. 8, 2022

(65) Prior Publication Data

US 2023/0070838 A1 Mar. 9, 2023

Related U.S. Application Data

(63) Continuation of application No. 17/164,465, filed on Feb. 1, 2021, now Pat. No. 11,539,497, which is a
(Continued)

(30) Foreign Application Priority Data

Aug. 11, 2017 (CN) .......................... 201710687963.7
Sep. 9, 2017 (CN) .......................... 201710808132.0
Sep. 30, 2017 (CN) .......................... 201710944153.5

(51) Int. Cl.
*H04L 5/00* (2006.01)
*H04W 4/02* (2018.01)
(Continued)

(52) U.S. Cl.
CPC .......... *H04L 5/0094* (2013.01); *H04W 4/025* (2013.01); *H04W 56/001* (2013.01);
(Continued)

(58) Field of Classification Search
CPC .... H04L 5/0094; H04L 5/0007; H04W 4/025; H04W 56/001; H04W 64/003; H04W 72/0453

See application file for complete search history.

(56) References Cited

U.S. PATENT DOCUMENTS 10,999,118 B2 5/2021 Park
11,539,497 B2 * 12/2022 Guo .................... H04W 64/003
(Continued)

FOREIGN PATENT DOCUMENTS

CN 102783048 A 11/2012
CN 102594513 B 1/2015
(Continued)

OTHER PUBLICATIONS

MCC Support, Final Report of 3GPP TSG RAN WG1 #88bis v1.0.0 (Spokane, USA, Apr. 3-7, 2017), 3GPP TSG RAN WG1 Meeting #89, R1-1708890, Hangzhou, China, May 15-9, 2017, 43 pages.
(Continued)

*Primary Examiner* — Kibrom T Hailu
(74) *Attorney, Agent, or Firm* — Slater Matsil, LLP

(57) ABSTRACT

A method for wireless communication and an apparatus are provided, comprising: determining location information, wherein the location information indicating a quantity of M subcarrier spacings between a second location of a physical resource block (PRB) in a system common PRB grid and a first location in a synchronization signal block, the system common PRB grid having a first subcarrier spacing, the first location being a beginning subcarrier of the synchronization
(Continued)

signal block and the first location overlapping with the PRB; sending the location information via a broadcast message.

33 Claims, 16 Drawing Sheets

Related U.S. Application Data continuation of application No. 16/235,965, filed on Dec. 28, 2018, now Pat. No. 10,911,208, which is a continuation of application No. PCT/CN2018/100086, filed on Aug. 10, 2018.

(51) Int. Cl.
  *H04W 56/00* (2009.01)
  *H04W 64/00* (2009.01)
  *H04W 72/0453* (2023.01)

(52) U.S. Cl.
  CPC ..... *H04W 64/003* (2013.01); *H04W 72/0453* (2013.01); *H04L 5/0007* (2013.01)

(56) References Cited

U.S. PATENT DOCUMENTS

| | | | |
|---|---|---|---|
| 2009/0270108 A1 | 10/2009 | Xu | |
| 2010/0271965 A1 | 10/2010 | Siomina et al. | |
| 2011/0188598 A1 | 8/2011 | Lee et al. | |
| 2012/0322483 A1 | 12/2012 | Ji et al. | |
| 2013/0016630 A1 | 1/2013 | Bhushan et al. | |
| 2013/0201975 A1 | 8/2013 | Chen et al. | |
| 2013/0294366 A1 | 11/2013 | Papasakellariou et al. | |
| 2014/0233457 A1 | 8/2014 | Koutsimanis et al. | |
| 2015/0003405 A1 | 1/2015 | Liao et al. | |
| 2015/0350928 A1 | 12/2015 | Zhang et al. | |
| 2016/0021642 A1 | 1/2016 | Kim et al. | |
| 2016/0316460 A1 | 10/2016 | Lee et al. | |
| 2016/0323870 A1 | 11/2016 | Wei et al. | |
| 2017/0111152 A1 | 4/2017 | Blankenship et al. | |
| 2017/0238292 A1 | 8/2017 | Rico Alvarino et al. | |
| 2017/0338911 A1 | 11/2017 | You et al. | |
| 2018/0159713 A1 | 6/2018 | Li et al. | |
| 2018/0227897 A1 | 8/2018 | Yeo et al. | |
| 2018/0248735 A1 | 8/2018 | Zhang et al. | |
| 2018/0338304 A1 | 11/2018 | Gheorghiu et al. | |
| 2019/0053061 A1 | 2/2019 | Sui et al. | |
| 2019/0116016 A1 | 4/2019 | Xiao et al. | |
| 2019/0116592 A1 | 4/2019 | Moon et al. | |
| 2019/0124628 A1 | 4/2019 | Xiao et al. | |
| 2019/0141711 A1 | 5/2019 | Fu et al. | |
| 2019/0182822 A1 | 6/2019 | Takeda et al. | |
| 2019/0254026 A1* | 8/2019 | Liu | H04W 72/0446 |
| 2019/0313451 A1 | 10/2019 | Liu et al. | |
| 2019/0357239 A1 | 11/2019 | Moon et al. | |
| 2020/0068512 A1 | 2/2020 | Xue et al. | |
| 2020/0344034 A1 | 10/2020 | Moon et al. | |

FOREIGN PATENT DOCUMENTS

| | | | |
|---|---|---|---|
| CN | 104662827 | A | 5/2015 |
| CN | 104754763 | A | 7/2015 |
| CN | 104919866 | A | 9/2015 |
| CN | 104936256 | A | 9/2015 |
| CN | 105101392 | A | 11/2015 |
| CN | 106507439 | A | 3/2017 |
| CN | 106559206 | A | 4/2017 |
| CN | 104094551 | B | 7/2017 |
| CN | 107005958 | A | 8/2017 |
| CN | 108347769 | A | 7/2018 |
| CN | 110574312 | A | 12/2019 |
| EP | 3602853 | B1 | 11/2022 |
| GB | 2558586 | A | 7/2018 |
| JP | 2020517181 | A | 6/2020 |
| JP | 2020521375 | A | 7/2020 |
| WO | 2017054667 | A1 | 4/2017 |
| WO | 2017139540 | A1 | 8/2017 |

OTHER PUBLICATIONS

Huawei, "Some discussions on SCS grid", 3GPP TSG-RAN WG4 Meeting #83, R4-1705293, Hangzhou, China, May 14-20, 2017, 3 pages.
Nokia et al., "Sync signal raster and subcarrier spacing", 3GPP TSG-RAN WG4 #83 Meeting, R4-1705697, Hangzhou, China, May 15-19, 2017, 5 pages.
Ericsson, "Analysis of raster concepts for Frequency ranges 1 and 2", 3GPP TSG-RAN WG4 meeting #84, R4-1707742, Berlin, Germany, Aug. 21-25, 2017, 7 pages.
3GPP TS 36.211 V12.6.0 (Jun. 2015), 3rd Generation Partnership Project; Technical Specification Group Radio Access Network; Evolved Universal Terrestrial Radio Access (E-UTRA); Physical channels and modulation (Release 12), 3GPP TS 36.211 V12.6.0 (Jun. 2015), 136 pages.
3rd Generation Partnership Project; Technical Specification Group Radio Access Network; NR; Physical channels and modulation (Release 15), 3GPP TS 38.211 V0.1.0 (Jun. 2017), 22 pages.
3rd Generation Partnership Project; Technical Specification Group Radio Access Network; NR; Radio Resource Control (RRC); Protocol specification (Release 15), 3GPP TS 38.331 V0.0.4 (Jun. 2017), 22 pages.
Huawei et al., "On initial access for wideband carrier", 3GPP TSG RAN WG1 NR Ad Hoc Meeting, R1-1709973, Qingdao, China, Jun. 27-30, 2017, 4 pages.
ITL, "Multiple SS block indication in wideband CC", 3GPP TSG RAN WG1 NR Ad-Hoc#2, R1-1711352, Qingdao, China, Jun. 27-30, 2017, 5 pages.
LG Electronics, "Remaining details on wider bandwidth operation", 3GPP TSG RAN WG1 Meeting Ad-Hoc, R1-1710352, Qingdao, China, Jun. 27-30, 2017, 9 pages.
MCC Support, "Final Report of 3GPP TSG RAN WG1 #88bis v1.0.0", 3GPP TSG RAN WG1 Meeting #89, R1-1708890, Hangzhou, China, May 15-19, 2017, 154 pages.
NEC, "PRB and RBG indexing for NR", 3GPP TSG-RAN WG1 NR Ad-Hoc#2, R1-1710249, Qingdao, P.R. China, Jun. 27-30, 2017, 6 pages.
NTT DOCOMO, Inc., "Discussion on system information delivery for NR", 3GPP TSG RAN WG1 Meeting 89, R1-1708440, Hangzhou, China, May 15-19, 2017, 4 pages.
Panasonic, "Remaining issues on NR frame structure focusing on frequency domain", 3GPP TSG RAN NG1 Meeting #88, R1-1702303, Athens, Greece, Feb. 13-17, 2017, 6 pages.
Qualcomm, "Channel Raster and Sync Raster for NR", 3GPP TSG-RAN WG4 RAN#84, R4-1708841, Berlin, Germany, Aug. 21-25, 2017, 11 pages.
3rd Generation Partnership Project; Technical Specification Group Radio Access Network; NR; Multiplexing and channel coding (Release 15), 3GPP TS 38.212, Jul. 2017, 25 Pages, V0.0.1.
3rd Generation Partnership Project; Technical Specification Group Radio Access Network; NR; Physical layer procedures for control (Release 15), 3GPP TS 38.213, Jul. 2017, 14 Pages, V0.0.1.
3rd Generation Partnership Project; Technical Specification Group Radio Access Network; NR; Physical layer procedures for data (Release 15), 3GPP TS 38.214, Jul. 2017, 30 Pages, V0.0.1.
3rd Generation Partnership Project; Technical Specification Group Radio Access Network; NR; NR and NG-RAN Overall Description; Stage 2 (Release 15), 3GPP TS 38.300, Aug. 2017, 58 Pages, V0.6.0.
Intel Corporation, "Draft of TS38.133 v.0.0.1", 3GPP TSG-RAN WG4 Meeting #83, R4-1704696, May 15-19, 2017, 1 page, Hangzhou, China.
Huawei, "Way Forward on Spectral Utilization", 3GPP TSG-RAN WG4 NR#2, R4-1706929, May 27-29, 2017, 3 pages, Qingdao, China.

(56) References Cited

OTHER PUBLICATIONS

Qualcomm Incorporated, "Common control resource set signaling in MIB," 3GPP TSG RAN WG1 NR Ad-Hoc#2, R1-1711186, Jun. 27-30, 2017, 8 pages.
Nokia Nullity Action EP, 3582567 BI as offically received from GFPC, dated Jun. 19, 2023, and its English translation, 106 pages.
Qualcomm Inc., "Channel Raster and Synchronization Signal Raster for NR", 3GPP TSG-RAN#84, R4-1707335, Berlin, Germany, Aug. 21-25, 2017, 5 pages.
Panasonic, "Discussion on PRB grid and PRB indexing", 3GPP TSG RAN WG1 NR Ad Hoc#2, R1-1710943, Qingdao, PR China, Jun. 27-30, 2017, 5 pages.
3GPP TS 36.331 V14.3.0 (Jun. 2017), 3rd Generation Partnership Project; Technical Specification Group Radio Access Network; Evolved Universal Terrestrial Radio Access (E-UTRA); Radio Resource Control (RRC); Protocol specification (Release 14), 745 pages.
3GPP TS 36.212 V14.3.0 (Jun. 2017), 3rd Generation Partnership Project; Technical Specification Group Radio Access Network; Evolved Universal Terrestrial Radio Access (E-UTRA); Multiplexing and channel coding (Release 14), 198 pages.
3GPP TS 38.211 V1.0.0 (Sep. 2017); 3rd Generation Partnership Project; Technical Specification Group Radio Access Network; NR; Physical channels and modulation (Release 15); 37 pages.
ZTE et al., "Way Forward on RB allocation for mixed numerologies", 3GPP TSG RAN WG1 #86, R1-167929, Gothenborg, Sweden, Aug. 22-26, 2016, 3 pages.
Qualcomm Inc., "Remaining system information delivery consideration", 3GPP TSG-RAN WG1 NR#90, R1-1713376, Prague, Czech Republic, Aug. 21-25, 2017, 8 pages.

\* cited by examiner

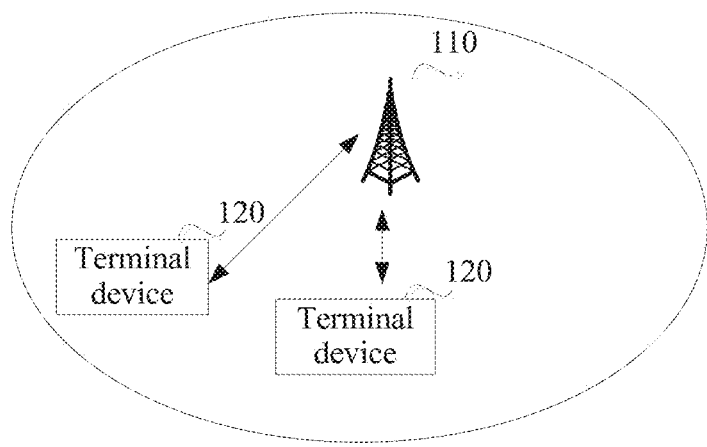
FIG. 1
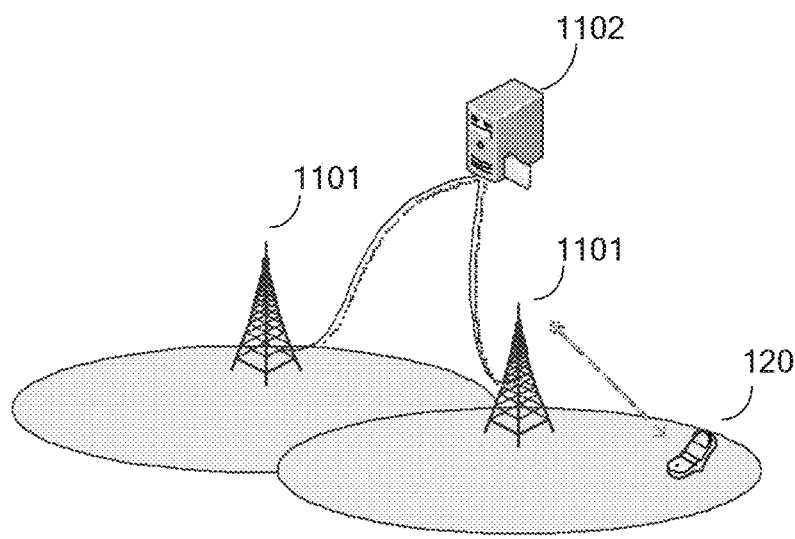
FIG. 2
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
FIG. 3
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 |
FIG. 3a

| GB | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | GB |
FIG. 4
| GB | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | GB |
FIG. 4a
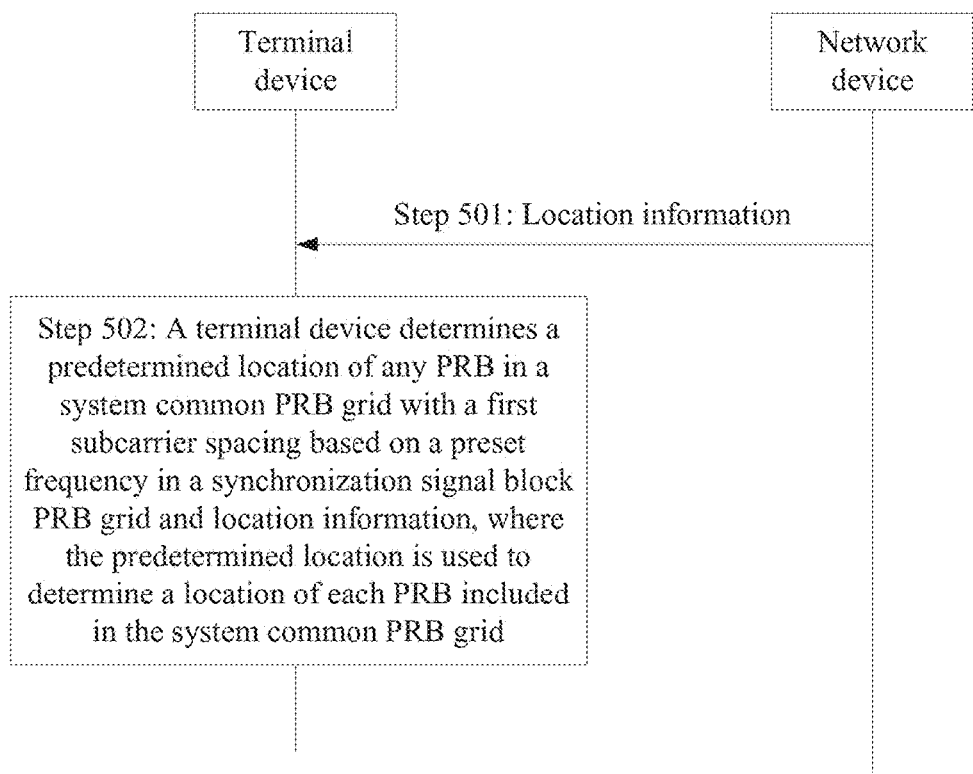
FIG. 5
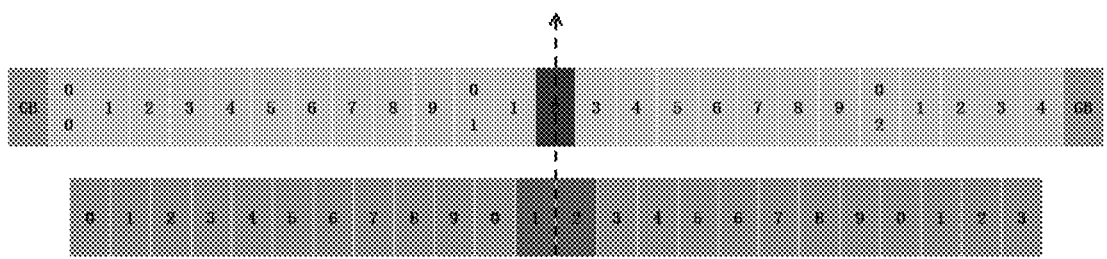
FIG. 6

PHYSICAL RESOURCE BLOCK PRB GRID INDICATION METHOD AND DEVICE

CROSS-REFERENCE TO RELATED APPLICATIONS

This application is a continuation of U.S. patent application Ser. No. 17/164,465, filed on Feb. 1, 2021, which is a continuation of U.S. patent application Ser. No. 16/235,965, filed on Dec. 28, 2018, now U.S. Pat. No. 10,911,208, which is a continuation of International Application No. PCT/CN2018/100086, filed on Aug. 10, 2018, which claims priority to Chinese Patent Application No. 201710687963.7, filed on Aug. 11, 2017, Chinese Patent Application No. 201710808132.0, filed on Sep. 9, 2017, Chinese Patent Application No. 201710944153.5, filed on Sep. 30, 2017. All of the afore-mentioned patent applications are hereby incorporated by reference in their entireties.

TECHNICAL FIELD

This application relates to the field of wireless communications technologies, and in particular, to a physical resource block (PRB) grid indication method and an apparatus.

BACKGROUND

As wireless communications systems develop and evolve, 5th generation (5G) new radio is being defined. The 5G new radio has defined a structure of a synchronization signal (SS) block. The synchronization signal block includes a primary synchronization signal (PSS), a secondary synchronization signal (SSS), and a physical broadcast channel, and a physical resource block (PRB) grid of the synchronization signal block includes 24 PRBs. The 5G new radio has further defined quantities of PRBs included in system common PRB grids corresponding to different subcarrier spacings in different system bandwidths.

Currently, after receiving a synchronization signal block sent by a network device, a terminal device can obtain a PRB grid of the synchronization signal block from a PBCH in the synchronization signal block. However, currently, the 5G new radio has not yet defined a method for obtaining, by a terminal device, a PRB location in a system common PRB grid, and the 5G new radio has not yet defined structures of system common PRB grids corresponding to different subcarrier spacings in different system bandwidths.

SUMMARY

Embodiments of this application provide a PRB grid indication method and a device, so that a terminal device in a 5G system obtains a PRB location in a system common PRB grid, and structures of system common PRB grids corresponding to different subcarrier spacings in different system bandwidths in the 5G system are defined.

According to a first aspect, an embodiment of this application provides a PRB grid indication method, including: receiving, by a terminal device, location information sent by a network device, where the location information is used to indicate a relative location relationship between a first predetermined location in a synchronization signal block PRB grid and any PRB in a system common PRB grid with a first subcarrier spacing; and determining, by the terminal device, a second predetermined location of the any PRB based on the first predetermined location and the location information, where the second predetermined location is used to determine a location of a PRB included in the system common PRB grid.

The first predetermined location in the synchronization signal block PRB grid is a predefined location in a synchronization signal block PRB grid, and is not limited. The first subcarrier spacing is a predefined subcarrier spacing. For example, the first subcarrier spacing may be one of subcarrier spacings of 15 kHz, 30 kHz, and 60 kHz.

In the foregoing method, the network device sends the location information to the terminal device, where the location information is used to indicate the relative location relationship between the first predetermined location in the synchronization signal block PRB grid and the any PRB in the system common PRB grid with the first subcarrier spacing; and the terminal device may determine the second predetermined location of the any PRB in the system common PRB grid with the first subcarrier spacing based on the first predetermined location in the synchronization signal block PRB grid and the location information, where the second predetermined location is used to determine the location of the PRB included in the system common PRB grid. Therefore, the terminal device in a 5G system can obtain the PRB location in the system common PRB grid.

In an implementation, the terminal device receives a broadcast message carried on a physical broadcast channel and sent by the network device, where the broadcast message carries the location information.

By using the foregoing method, the terminal device can obtain the location information from the network device.

In an implementation, the location information may be represented in the following two manners:

In one location information representation manner, the location information is used to indicate that the first predetermined location in the synchronization signal block PRB grid and the any PRB in the system common PRB grid with the first subcarrier spacing have an offset of N PRBs, where N is greater than or equal to 0. For example, N is 0.5 or 0. The offset may be a left offset or a right offset.

In this way, after the terminal device receives the location information, the first predetermined location in the synchronization signal block PRB grid may be offset by N PRBs to the left or the right, to obtain the any PRB in the system common PRB grid with the first subcarrier spacing.

In the other location information representation manner, the location information is used to indicate that the first predetermined location in the synchronization signal block PRB grid and the any PRB in the system common PRB grid with the first subcarrier spacing have an offset of M number of subcarrier spacings, where M is greater than or equal to 0. For example, M is 0, 2, 6, or 8. The offset may be a left offset or a right offset.

In this way, after the terminal device receives the location information, the first predetermined location in the synchronization signal block PRB grid may be offset M number of subcarrier spacings to the left or the right, to obtain the any PRB in the system common PRB grid with the first subcarrier spacing.

In an implementation, the second predetermined location in the system common PRB grid may be set as any location in the system common PRB grid. For example, the second predetermined location may be a boundary location or a central location of the any PRB.

In an implementation, the first predetermined location is any one of the following: a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

In an implementation, that the terminal device determines the location of the PRB included in the system common PRB grid may apply to a plurality of scenarios. In a scenario, after the terminal device determines the location of the PRB included in the system common PRB grid, if the network device schedules the terminal device in a location at a distance of Q PRBs from the any PRB in the system common PRB grid, the terminal device may determine the location at the distance of Q PRBs from the any PRB based on the second predetermined location of the any PRB in the system common PRB grid with the first subcarrier spacing and a width of one PRB, where Q is an integer greater than or equal to 0; and then the terminal device may be scheduled by the network device in the scheduling location.

In an implementation, after determining the second predetermined location of the any PRB based on the first predetermined location and the location information, the terminal device determines a location of a PRB in a system common PRB grid with a second subcarrier spacing based on the second predetermined location of the any PRB in the system common PRB grid with the first subcarrier spacing, where the second subcarrier spacing and the first subcarrier spacing are different, and the system common PRB grid with the first subcarrier spacing and the system common PRB grid with the second subcarrier spacing belong to a same system bandwidth.

In the foregoing method, there is a multiple relationship between widths of PRBs corresponding to different subcarrier spacings in a same system bandwidth. For example, for a same system bandwidth, one PRB with a subcarrier spacing of 30 kHz is twice the width of one PRB with a subcarrier spacing of 15 kHz; one PRB with a subcarrier spacing of 60 kHz is four times the width of one PRB with a subcarrier spacing of 15 kHz. Therefore, based on the multiple relationship, the location of the PRB included in the system common PRB grid with the second subcarrier spacing can be determined based on the location of the PRB included in the system common PRB grid with the first subcarrier spacing.

According to a second aspect, an embodiment of this application provides a physical resource block (PRB) grid indication method, including: sending, by a network device, location information to a terminal device, where the location information is used to indicate a relative location relationship between a first predetermined location in a synchronization signal block PRB grid and any PRB in a system common PRB grid with a first subcarrier spacing, the first predetermined location and the location information are used by the terminal device to determine a second predetermined location of the any PRB, and the second predetermined location is used to determine a location of a PRB included in the system common PRB grid.

In the foregoing method, the network device sends the location information to the terminal device, where the location information is used to indicate the relative location relationship between the first predetermined location in the synchronization signal block PRB grid and the any PRB in the system common PRB grid with the first subcarrier spacing; and the terminal device may determine the second predetermined location of the any PRB in the system common PRB grid with the first subcarrier spacing based on the first predetermined location in the synchronization signal block PRB grid and the location information, where the second predetermined location is used to determine the location of the PRB included in the system common PRB grid. Therefore, the terminal device in a 5G system can obtain the PRB location in the system common PRB grid.

In an implementation, the network device sends a broadcast message carried on a physical broadcast channel to the terminal device, where the broadcast message carries the location information.

In an implementation, that the location information is used to indicate a relative location relationship between a first predetermined location in a synchronization signal block PRB grid and any PRB in a system common PRB grid with a first subcarrier spacing is specifically: the location information is used to indicate that the first predetermined location and the second predetermined location of the any PRB have an offset of N PRBs, where N is greater than or equal to 0; or the location information is used to indicate that the first predetermined location and the second predetermined location of the any PRB have an offset of M number of subcarrier spacings, where M is greater than or equal to 0.

In an implementation, the second predetermined location is a boundary location or a central location of the any PRB.

In an implementation, the first predetermined location is any one of the following: a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

According to a third aspect, an embodiment of this application provides a physical resource block (PRB) grid indication method, including: receiving, by a terminal device, scheduling information sent by a network device, where the scheduling information is used by the network device to schedule the terminal device on a specified PRB, and the specified PRB is a PRB in a system common PRB grid with a subcarrier spacing in a system bandwidth; and determining, by the terminal device, a location of the specified PRB based on predetermined information, where the predetermined information is used to indicate system common PRB grids with different subcarrier spacings in any one of at least one system bandwidth.

The specified PRB is a PRB in a system common PRB grid with a subcarrier spacing in a system bandwidth. In this case, the system bandwidth and the subcarrier spacing that correspond to the specified PRB are known, and a sequence number of the specified PRB in the system common PRB grid is also known.

The predetermined information is based on system common PRB grids with different subcarrier spacings in different system bandwidths that are defined in this embodiment. The system common PRB grids with the different subcarrier spacings in the different system bandwidths that are defined in this embodiment may be specified in a future protocol, and in this case, the network device and the terminal device have known the system common PRB grids defined in this embodiment. Alternatively, the network device has known the system common PRB grids defined in this embodiment, and the network device notifies the terminal device of the system common PRB grids defined in this embodiment. This is not limited in this embodiment.

By using the foregoing method, the terminal device can determine a location of any PRB based on the predetermined information, that is, the system common PRB grids with the different subcarrier spacings in the different system bandwidths that are defined in this embodiment. It should be noted that, the system common PRB grids with the different subcarrier spacings in the different system bandwidths that are defined in this embodiment can not only apply to a scenario in which the network device schedules the terminal device, but can also apply to another scenario. This is not limited in this embodiment.

In an implementation, that the predetermined information is used to indicate system common PRB grids with different subcarrier spacings in any one of at least one system bandwidth is specifically: the predetermined information is used to indicate a location of a PRB in the system common PRB grids with the different subcarrier spacings in the any one of the at least one system bandwidth; or the predetermined information is used to indicate a location of a PRB in a first system common PRB grid and a relative location relationship between the first system common PRB grid and a second system common PRB grid, where the first system common PRB grid and the second system common PRB grid belong to a same system bandwidth in the at least one system bandwidth, and a subcarrier spacing of the first system common PRB grid and a subcarrier spacing of the second system common PRB grid are different.

According to a fourth aspect, an embodiment of this application provides a terminal device, and the terminal device has a function of implementing terminal device behavior in the method example provided in the first aspect. The function may be implemented by hardware, or may be implemented by hardware executing corresponding software. The hardware or software includes one or more modules corresponding to the foregoing function.

In a possible implementation, a structure of the terminal device includes a processing unit and a transceiver unit, and the processing unit is configured to support the terminal device in performing corresponding functions in the foregoing method. The transceiver unit is configured to support communication between the terminal device and another device (including a network device). The terminal device may further include a storage unit, and the storage unit is coupled to the processing unit, and stores a program instruction and data necessary for the terminal device.

In another possible implementation, a structure of the terminal device includes a memory, a processor, and a communications module. The memory is configured to store a computer readable program; the processor invokes an instruction stored in the memory, to perform the foregoing method performed by the terminal device in the first aspect; and the communications module is configured to send and/or receive data under control of the processor.

As an example, the processing unit may be the processor, the transceiver unit may be the communications module, and the storage unit may be the memory. The communications module may be a plurality of components, that is, includes a transmitter and a receiver; or includes a communications interface, and the communications interface has a sending and receiving function.

According to a fifth aspect, an embodiment of this application further provides a computer storage medium. The storage medium stores a software program, and when being read and executed by one or more processors, the software program can implement the method performed by the terminal device in the PRB grid indication method provided in the first aspect.

According to a sixth aspect, an embodiment of this application further provides a PRB grid indication apparatus. The apparatus includes a chip, and the chip is configured to perform the method performed by the terminal device in the PRB grid indication method provided in the first aspect. The apparatus may further include a communications module, and the chip included in the apparatus performs, by using the communications module, a method for sending and/or receiving data by the terminal device in the foregoing method for reducing interference to the terminal device.

According to a seventh aspect, an embodiment of this application further provides a computer program product including an instruction, and when running on a computer, the computer program product enables the computer to perform the method performed by the terminal device in the PRB grid indication method provided in the first aspect.

According to an eighth aspect, an embodiment of this application provides a network device, and the network device has a function of implementing network device behavior in the method example provided in the second aspect. The function may be implemented by hardware, or may be implemented by hardware executing corresponding software. The hardware or software includes one or more modules corresponding to the foregoing function.

In a possible implementation, a structure of the network device includes a processing unit and a transceiver unit, and the processing unit is configured to support the network device in performing corresponding functions in the foregoing method. The transceiver unit is configured to support communication between the network device and another device (including a terminal device). The network device may further include a storage unit, and the storage unit is coupled to the processing unit, and stores a program instruction and data necessary for the network device.

In another possible implementation, a structure of the network device includes a memory, a processor, and a communications module. The memory is configured to store a computer readable program; the processor invokes an instruction stored in the memory, to perform the foregoing method performed by the network device in the second aspect; and the communications module is configured to send and/or receive data under control of the processor.

As an example, the processing unit may be the processor, the transceiver unit may be the communications module, and the storage unit may be the memory. The communications module may be a plurality of components, that is, includes a transmitter and a receiver; or includes a communications interface, and the communications interface has a sending and receiving function.

According to a ninth aspect, an embodiment of this application further provides a computer storage medium. The storage medium stores a software program, and when being read and executed by one or more processors, the software program can implement the method performed by the network device in the PRB grid indication method provided in the second aspect.

According to a tenth aspect, an embodiment of this application further provides a PRB grid indication apparatus. The apparatus includes a chip, and the chip is configured to perform the method performed by the network device in the PRB grid indication method provided in the second aspect. The apparatus may further include a communications module, and the chip included in the apparatus performs, by using the communications module, a method for sending and/or receiving data by the network device in the foregoing method for reducing interference to the network device.

According to an eleventh aspect, an embodiment of this application further provides a computer program product including an instruction, and when running on a computer, the computer program product enables the computer to perform the method performed by the network device in the PRB grid indication method provided in the second aspect.

According to a twelfth aspect, an embodiment of this application further provides a communications system, and the communications system includes a terminal device and a network device. The terminal device is configured to perform the method performed by the terminal device in the PRB grid indication method provided in the first aspect, and the terminal device may be the same device as the terminal device provided in the fourth aspect. The network device is configured to perform the method performed by the network device in the PRB grid indication method provided in the second aspect, and the network device may be the same device as the network device provided in the eighth aspect. A PRB grid indication method provided in an embodiment of this application can be implemented by using the communications system.

According to a twelfth aspect, an embodiment of this application provides a terminal device, and the terminal device has a function of implementing terminal device behavior in the method example provided in the third aspect. The function may be implemented by hardware, or may be implemented by hardware executing corresponding software. The hardware or software includes one or more modules corresponding to the foregoing function.

In a possible implementation, a structure of the terminal device includes a processing unit and a transceiver unit, and the processing unit is configured to support the terminal device in performing corresponding functions in the foregoing method. The transceiver unit is configured to support communication between the terminal device and another device (including a network device). The terminal device may further include a storage unit, and the storage unit is coupled to the processing unit, and stores a program instruction and data necessary for the terminal device.

In another possible implementation, a structure of the terminal device includes a memory, a processor, and a communications module. The memory is configured to store a computer readable program; the processor invokes an instruction stored in the memory, to perform the foregoing method performed by the terminal device in the third aspect; and the communications module is configured to send and/or receive data under control of the processor.

As an example, the processing unit may be the processor, the transceiver unit may be the communications module, and the storage unit may be the memory. The communications module may be a plurality of components, that is, includes a transmitter and a receiver; or includes a communications interface, and the communications interface has a sending and receiving function.

According to a thirteenth aspect, an embodiment of this application further provides a computer storage medium. The storage medium stores a software program, and when being read and executed by one or more processors, the software program can implement the method performed by the terminal device in the PRB grid indication method provided in the third aspect.

According to a fourteenth aspect, an embodiment of this application further provides a PRB grid indication apparatus. The apparatus includes a chip, and the chip is configured to perform the method performed by the terminal device in the PRB grid indication method provided in the third aspect. The apparatus may further include a communications module, and the chip included in the apparatus performs, by using the communications module, a method for sending and/or receiving data by the terminal device in the foregoing method for reducing interference to the terminal device.

According to a fifteenth aspect, an embodiment of this application further provides a computer program product including an instruction, and when running on a computer, the computer program product enables the computer to perform the method performed by the terminal device in the PRB grid indication method provided in the third aspect.

According to a sixteenth aspect, an embodiment of this application further provides a structure of a synchronization signal block. The sixteenth aspect may be combined with the technical solution in any one of the foregoing aspects.

In a possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, at least one of the first subcarrier carrying a synchronization sequence modulation signal in the primary synchronization signal and the first subcarrier carrying a synchronization sequence modulation signal in the secondary synchronization signal has the same frequency as or is aligned with the first subcarrier carrying a physical broadcast channel modulation signal in the physical broadcast channel. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

In another possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, at least one of the last subcarrier carrying a synchronization sequence modulation signal in the primary synchronization signal and the last subcarrier carrying a synchronization sequence modulation signal in the secondary synchronization signal has the same frequency as or is aligned with the last subcarrier carrying a physical broadcast channel modulation signal in the physical broadcast channel; or in frequency domain, at least one of the first subcarrier carrying a synchronization sequence modulation signal in the primary synchronization signal and the first subcarrier carrying a synchronization sequence modulation signal in the secondary synchronization signal has the same frequency as or is aligned with the 145th subcarrier carrying a physical broadcast channel modulation signal in the physical broadcast channel. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

In another possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, the first subcarrier carrying a physical broadcast channel modulation signal and at least one of the first subcarrier carrying a synchronization sequence modulation signal in the primary synchronization signal and the first subcarrier carrying a synchronization sequence modulation signal in the secondary synchronization signal have a fifth offset value in frequency, where the fifth offset value is an integer multiple of a PRB, and is not 6 PRBs; or in frequency domain, the last subcarrier carrying a physical broadcast channel modulation signal in the physical broadcast channel and at least one of the last subcarrier carrying a synchronization sequence modulation signal in the primary synchronization signal and the last subcarrier carrying a synchronization sequence modulation signal in the secondary synchronization signal have a fifth offset value in frequency, where the fifth offset value is an integer multiple of a PRB, and is not 6 PRBs. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

In another possible implementation, the synchronization signal block includes a primary synchronization signal, a secondary synchronization signal, and a physical broadcast channel, and a physical resource block grid of the synchronization signal block includes A PRBs. A quantity of subcarriers carrying a synchronization sequence modulation signal in the primary synchronization signal is B, a quantity of subcarriers carrying a synchronization sequence modulation signal in the secondary synchronization signal is B, and a quantity of subcarriers carrying a physical broadcast channel modulation signal in the physical broadcast channel signal is C, where A, B, and C are positive integers, and B is not equal to C. In frequency domain, at least one of the first subcarrier carrying a synchronization sequence modulation signal in the primary synchronization signal and the first subcarrier carrying a synchronization sequence modulation signal in the secondary synchronization signal has the same frequency as or is aligned with the $D^{th}$ subcarrier carrying a physical broadcast channel modulation signal in the physical broadcast channel, where D is an integer greater than or equal to 1 and less than or equal to C-B+1, but is not equal to 73, or D is an integer greater than or equal to 1 and less than or equal to C-B+1, and is an integer multiple of 12 plus 1 but not equal to 73. Optionally, the A PRBs occupy a plurality of OFDM symbols in time domain.

In another possible implementation, the synchronization signal block includes a primary synchronization signal, a secondary synchronization signal, and a physical broadcast channel, and a physical resource block grid of the synchronization signal block includes A PRBs. The synchronization signal block occupies a plurality of OFDM symbols in time domain, the second and the third OFDM symbols of the synchronization signal block are nonconsecutive, and a distance between the second and the third symbols is one OFDM symbol. Optionally, the A PRBs occupy a plurality of OFDM symbols in time domain.

In another possible implementation, the synchronization signal block includes a primary synchronization signal, a secondary synchronization signal, and a physical broadcast channel, and a physical resource block grid of the synchronization signal block includes A PRBs. The synchronization signal block occupies a plurality of OFDM symbols in time domain, the third and the fourth OFDM symbols of the synchronization signal block are nonconsecutive, and a distance between the third and the fourth symbols is one OFDM symbol. Optionally, the A PRBs occupy a plurality of OFDM symbols in time domain.

BRIEF DESCRIPTION OF THE DRAWINGS

FIG. 1 is a schematic diagram of a network architecture to which a technical solution provided in an embodiment of this application is applicable;

FIG. 2 is a schematic diagram of another network architecture to which a technical solution provided in an embodiment of this application is applicable;

FIG. 3 and FIG. 3a are schematic structural diagrams of a synchronization signal block PRB grid according to an embodiment of this application;

FIG. 4 and FIG. 4a are schematic structural diagrams of a system common PRB grid according to an embodiment of this application;

FIG. 5 is a schematic flowchart of a PRB grid indication method according to an embodiment of this application;

FIG. 6 to FIG. 8 (FIG. 8 includes FIG. 8A and FIG. 8B) are schematic structural diagrams of several synchronization signal block PRB grids and system common PRB grids according to an embodiment of this application;

DETAILED DESCRIPTION OF ILLUSTRATIVE EMBODIMENTS

Figure 7:
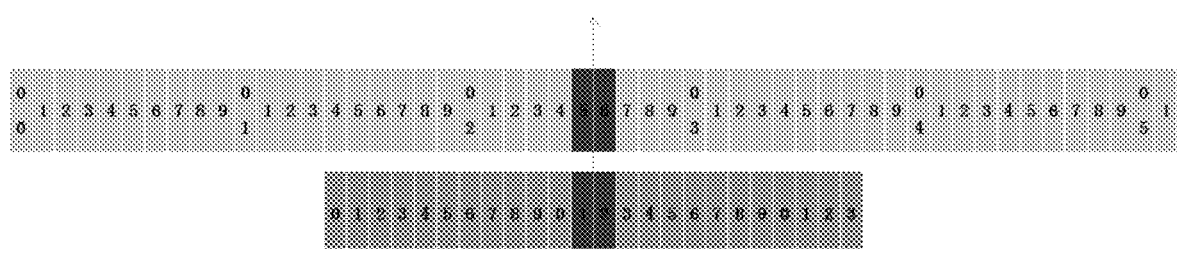

Currently, because 5G new radio has not yet defined a method for obtaining, by a terminal device, a PRB location in a system common PRB grid, and the 5G new radio has not yet defined structures of system common PRB grids corresponding to different subcarrier spacings in different system bandwidths, embodiments of this application provide a PRB grid indication method and a device. The method and the device are conceived based on a same inventive concept. The method and the device have similar principles for resolving the problems. Therefore, for implementation of the device and the method, reference may be made to each other, and details of repeated parts are not described.

Technical solutions provided in the embodiments of this application are applicable to a 5G system. Based on the 5G system, FIG. 1 and FIG. 2 are schematic diagrams of two network architectures to which the technical solutions provided in the embodiments of this application are applicable. A network shown in FIG. 1 includes a network device 110 and a terminal device 120, and FIG. 1 only shows one network device no and two terminal devices 120 that communicate with the network device no. A difference between a network shown in FIG. 2 and the network shown in FIG. 1 in that, a network device in the network shown in FIG. 1 virtually exists, some functions of the network device are implemented on a distributed unit (DU) 1101, the other functions of the network device are implemented on a centralized unit (CU) 1102, and a plurality of DUs 1101 may be connected to a same CU 1102. It should be noted that, the networks shown in FIG. 1 and FIG. 2 may both include at least one network device, and there may be at least one terminal device that communicates with each network device. Quantities of network devices and terminal devices are not limited to those shown in FIG. 1 and FIG. 2.

The terminal device in the 5G system in the embodiments of this application may be a device that provides a user with voice and/or data connectivity, a handheld device with a wireless connection function, or another processing device connected to a wireless modem. A wireless terminal device may communicate with one or more core networks via a Radio access network (RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communication service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a mobile console, a remote station, an access point (AP), a remote terminal device, an access terminal device, a user terminal device, a user agent, a user device, or user equipment.

The network device in the 5G system in the embodiments of this application may be a cell, an evolved NodeB (eNB or e-NodeB), or an access point, or may be a device in an access network that communicates with a wireless terminal device over an air interface by using one or more sectors. Main functions of the network device are radio resource management, Internet Protocol (IP) header compression and user data stream encryption, mobility management entity (MME) selection during a terminal device attaching, routing of user plane data to a serving gateway (S-GW), paging message organization and sending, broadcast message organization and sending, measurement for mobility or scheduling, measurement report configuration, and the like.

The following explains terms in the embodiments of this application.

I. PRB and Subcarrier Spacing

PRB: P consecutive subcarriers occupied in frequency domain and R consecutive symbols occupied in time domain, where P and R are natural numbers greater than or equal to 1. For example, P=12 and R=7, or P=12 and R=14, or P=12 and R=1. When P=12, and R=7, it indicates that one PRB may occupy 12 consecutive subcarriers in frequency domain and 7 consecutive symbols in time domain.

Subcarrier spacing: the finest granularity in frequency domain. For example, in LTE, a subcarrier spacing of a subcarrier is 15 kHz; in a 5G system, a width of a subcarrier may be one of 15 kHz, 30 kHz, and 60 kHz.

II. Synchronization Signal Block PRB Grid

FIG. 3 shows a structure of a synchronization signal block PRB grid that has been defined by 5G new radio. A small rectangle in FIG. 3 represents a PRB, and a number in each small rectangle represents a location of a PRB in the synchronization signal block PRB grid, or the number may also be referred to as an index of the PRB. The synchronization signal block PRB grid includes 24 PRBs, and therefore the PRBs in the synchronization signal block PRB grid are PRBs numbered 0 to 23. For ease of example description, a numbering method shown in FIG. 3a is used for numbering in the following embodiments, where numbers of the PRBs include 0 to 9, and the numbers may appear cyclically, to indicate that the PRBs in the synchronization signal block PRB grid are PRBs numbered 0 to 23. However, it may be understood that such numbering is merely intended for example description. For the structure of the synchronization signal block PRB grid, refer to a definition in a 5G new radio related standard.

The 5G new radio has defined a structure of a synchronization signal block, and the synchronization signal block includes a primary synchronization signal, a secondary synchronization signal, and a physical broadcast channel.

First, a "predetermined location" to be used below is explained. The predetermined location of the synchronization signal block needs to be an integer multiple of a unit frequency. For example, if the unit frequency is 100 kHz, the predetermined location of the synchronization signal block is an integer multiple of 100 kHz. For example, the predetermined location of the synchronization signal block may be 200 kHz or 300 kHz. The predetermined location may be any one of the following: a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and the $145^{th}$ subcarrier of a physical channel corresponding to the synchronization signal block PRB grid.

III. System Common PRB Grid

Quantities of PRBs included in system common PRB grids corresponding to different subcarrier spacings in different system bandwidths that have been defined by the 5G new radio are shown in Table 1:

TABLE 1

| SCS [kHz] | 5 MHz $N_{RB}$ | 10 MHz $N_{RB}$ | 15 MHz $N_{RB}$ | 20 MHz $N_{RB}$ | 25 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|
| 15 | 25 | 52 | [79] | [106] | [133, 135] | [216] | 270 | N.A | N.A | N.A |
| 30 | [11] | [24] | [38] | [51, 52] | [65] | [106] | 133 | [162] | [217] | [273] |
| 60 | N.A | [11, 12] | [18] | [24] | [31, 32] | [51, 52] | [65] | [79] | [107] | [135] |

In Table 1, for example, when a system bandwidth is 5 MHz, a system common PRB grid with a subcarrier spacing of 15 kHz includes 25 PRBs. A structure of the system common PRB grid is shown in FIG. 4. A small rectangle in FIG. 4 represents a PRB, and a number in each small rectangle represents a location of a PRB in the system common PRB grid. The system common PRB grid includes 25 PRBs, and therefore the PRBs in the system common PRB grid are PRBs numbered 0 to 24. GB in FIG. 4 represents a guard band, and the guard band is an unused bandwidth within a specific system bandwidth, reserved for preventing interference to another system. For ease of example description, a numbering method shown in FIG. 4a is used for numbering in the following embodiments, where numbers of the PRBs include 0 to 9, and the numbers may appear cyclically, to indicate that the PRBs in the system common PRB grid are PRBs numbered 0 to 24. However, it may be understood that such numbering is merely intended for example description. For the structure of the system common PRB grid, refer to a definition in a 5G new radio related standard.

The technical solutions provided in the embodiments of this application are described below with reference to the accompanying drawings.

An embodiment of this application provides a PRB grid indication method, and the method is used to allow a terminal device in a 5G system to obtain a PRB location in a system common PRB grid. FIG. 5 is a schematic flowchart of a PRB grid indication method, and the method includes the following steps.

Step 501: A network device sends location information to a terminal device.

In step 501, the location information is used to indicate a relative location relationship between a first predetermined location in a synchronization signal block PRB grid and any PRB in a system common PRB grid with a first subcarrier spacing. In an implementation, the network device may send a broadcast message carried on a broadcast channel to the terminal device, for example, a broadcast message of a physical broadcast channel, where the broadcast message carries the location relationship. For example, the first predetermined location may be a frequency. For example, the location information occupies 5 bits or 6 bits in the broadcast message.

Figure 34:
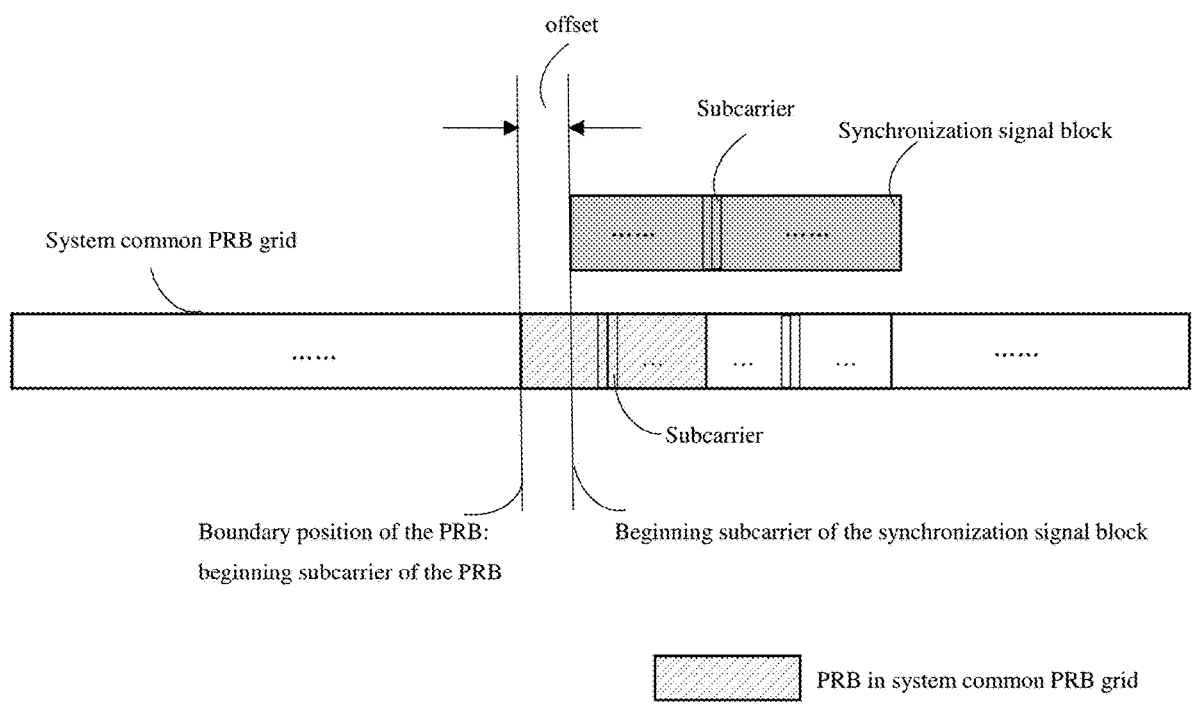
FIG. 34 is a schematic structural diagram of a synchronization signal block PRB grids and system common PRB grid according to an embodiment of this application.

The first predetermined location in the synchronization signal block PRB grid is a predefined location in a synchronization signal block PRB grid, and the first predetermined location in the synchronization signal block PRB grid may be set as any location in the synchronization signal block PRB grid. A specific location of the first predetermined location in the synchronization signal block PRB grid is not limited in this embodiment. It may be understood that the first predetermined location may be used as a reference to obtain a corresponding PRB in the system common PRB grid. For example, the first predetermined location is any one of the following: a center frequency of the synchronization signal block PRB grid, a frequency corresponding to the first subcarrier of the synchronization signal block PRB grid (shown in FIG. 34), a carrier frequency location of a synchronization signal block corresponding to the synchronization signal block PRB grid, a center frequency corresponding to a subcarrier closest to the center frequency of the synchronization signal block PRB grid, and the $145^{th}$ subcarrier of a physical channel corresponding to the synchronization signal block PRB grid. The first subcarrier spacing is a predefined subcarrier spacing. For example, the first subcarrier spacing may be any one of subcarrier spacings of 15 kHz, 30 kHz, 60 kHz, 120 kHz, 240 kHz, and 480 kHz. Alternatively, the first subcarrier spacing is a maximum subcarrier spacing supported by all channels within a frequency band in which the system common PRB grid or the synchronization signal block PRB grid is located. Alternatively, the first subcarrier spacing may be a maximum subcarrier spacing supported by a data channel within a frequency band in which the system common PRB grid or the synchronization signal block PRB grid is located. The any PRB in the system common PRB grid with the first subcarrier spacing may be understood as a PRB at any location in the system common PRB grid with the first subcarrier spacing, for example, the first PRB or the second PRB in the system common PRB grid. A specific location where the any PRB in the system common PRB grid with the first subcarrier spacing is located at is not limited in this embodiment. It may be understood that the any PRB may be used as a reference for the terminal to obtain a structure of the system common PRB grid. After the relative location relationship is determined, the any PRB is used as a specific PRB with reference to the relative location relationship. The any PRB is a PRB in the system common PRB grid that corresponds to the first predetermined location, or the any PRB is a PRB in the system common PRB grid that is closest to the first predetermined location. In this embodiment, alternatively, the location of the any PRB in the system common PRB grid may be predefined, that is, the any PRB is a specified PRB in the system common PRB grid. For example, the specified PRB may be the first PRB or the second PRB in the system common PRB grid. Alternatively, the any PRB is a PRB in a control resource set(CORESET) in the system common PRB grid, for example, the first PRB in the control resource set.

It should be noted that the location information may not include a sequence number of the any PRB in the system common PRB grid, because the network device may know the sequence number of the any PRB in the system common PRB grid. However, after receiving the location information sent by the network device, the terminal device has not yet known a structure of the system common PRB grid, in other words, a specific number corresponding to the any PRB. The location information may reflect the first subcarrier spacing or may not reflect the first subcarrier spacing. If the terminal device knows the first subcarrier spacing, the location relationship may not reflect the first subcarrier spacing.

In this embodiment, the location information may be represented in the following three manners.

In a first location information representation manner, the relative location relationship between the first predetermined location in the synchronization signal block PRB grid and the any PRB in the system common PRB grid with the first subcarrier spacing is represented by using a quantity of PRBs. In other words, the location information is used to indicate that the first predetermined location in the synchronization signal block PRB grid and the any PRB in the system common PRB grid with the first subcarrier spacing have an offset of N PRBs, where N is greater than or equal to 0. For example, N is 0.5 or 0.0.5 PRB means half a PRB.

In the foregoing first location information representation manner, for example, N may meet any one of the following conditions:

Maximum value of N≤2×First bandwidth−Bandwidth of a synchronization signal block; and Maximum value of N≤2×First bandwidth−Bandwidth of a synchronization signal block—Bandwidth of a control resource, where the first bandwidth is a maximum receiving bandwidth supported by the terminal device within a current frequency band, or the first bandwidth is a maximum bandwidth in receiving bandwidths supported by the terminal device. The current frequency band is a frequency band in which the system common PRB grid or the synchronization signal block PRB grid is located. Alternatively, the first bandwidth is any bandwidth corresponding to 11, 18, 24, 25, 31, 32, 38, 51, 52, 65, 66, 79, 106, 107, 132, 133, 135, 162, 216, 217, 264, 270, or 273 RBs.

For example, N may alternatively be any one value of a preset value set. The preset value set may be agreed upon by the network device and the terminal device during initialization; or the preset value set is specified in a standard protocol, and the network device and the terminal device comply with the standard protocol. In short, both the network device and the terminal device have known the preset value set. For example, the preset value set is {0, 1, 2, 3, 4, 5, 6, 7, 8, 9, 10}, and for another example, the preset value set is {0, 2, 4, 6, 8, 10}. Values constituting the preset value set are not limited in this embodiment.

An implementation of the location information when N is the any one value of the preset value set is further described below.

In an implementation, the location information is a position of a value of N in the preset value set, and the position may be a number of the value corresponding to N in the preset value set. For example, the preset value set is {0, 2, 4, 6, 8, 10}, and 3 bits are required to represent the location information, where 000 represents the first value in the preset value set, and N is 0; 001 represents the second value in the preset value set, and N is 2; 010 represents the third value in the preset value set, and N is 4; 011 represents the fifth value in the preset value set, and N is 8; 100 represents the sixth value in the preset value set, and N is 10. Therefore, for example, when the location information sent by the network device to the terminal device is 011, it indicates that the first predetermined location in the synchronization signal block PRB grid and a PRB in the system common PRB grid with the first subcarrier spacing have an offset of 8 PRBs.

In another implementation, content included in the location information is N. For example, the preset value set is {0, 2, 4, 6, 8, 10}, and 4 bits are required to represent a value of N, where 0000 indicates that N is 0, 0010 indicates that N is 2, 0100 indicates that N is 4, woo indicates that N is 8, and low indicates that N is 10. Therefore, for example, when the location information sent by the network device to the terminal device is moo, it indicates that the first predetermined location in the synchronization signal block PRB grid and a PRB in the system common PRB grid with the first subcarrier spacing have an offset of 8 PRBs.

In the foregoing first location information representation manner, the location information is used to indicate that the first predetermined location in the synchronization signal block PRB grid and a PRB in the system common PRB grid with the first subcarrier spacing have an offset of N PRBs. For example, a subcarrier spacing corresponding to the N PRBs may be a maximum subcarrier spacing supported by all channels within a frequency band in which the system common PRB grid is located, or a subcarrier spacing corresponding to the PRB in the N PRBs may be a maximum subcarrier spacing supported by a data channel within a frequency band in which the PRB grid is located. Alternatively, a subcarrier spacing corresponding to the N PRBs is a subcarrier spacing of a synchronization signal block. Alternatively, a subcarrier spacing corresponding to the PRB in the N PRBs may be any one of 30 kHz, 60 kHz, 120 kHz, 240 kHz, or 480 kHz. This is not limited in this embodiment.

The following describes the location information in the first manner by using examples.

Example description 1: Using location information shown in FIG. 6 as an example, an upper grid in FIG. 6 represents a system common PRB grid with a subcarrier spacing of 15 kHz (that is, the foregoing first subcarrier spacing) in a system bandwidth of 5 MHz, and a lower grid in FIG. 6 represents a synchronization signal block PRB grid. In FIG. 6, a first predetermined location in the synchronization signal block PRB grid is a center frequency in the synchronization signal block PRB grid, that is, a frequency at which a dashed line with an arrowhead between the second PRB numbered 1 and the second PRB numbered 2 in the synchronization signal block PRB grid is located. It is assumed that any PRB in the system common PRB grid in the location information is a PRB grid through which the dashed line passes, that is, the second PRB numbered 2 in the system common PRB grid. The dashed line and a left boundary of the second PRB numbered 2 in the system common PRB grid have an offset of 0.5 PRB. Therefore, the location information in FIG. 6 may have a plurality of representation methods, and two representation methods of which are as follows: In the first representation method, the location information is used to indicate that the center frequency in the synchronization signal block PRB grid and a left boundary of the any PRB in the system common PRB grid with the first subcarrier spacing have an offset of 0.5 PRB. In the second representation method, the location information is used to indicate that the center frequency in the synchronization signal block PRB grid and a right boundary of the any PRB in the system common PRB grid with the first subcarrier spacing have an offset of 0.5 PRB. In the foregoing two representation methods, second predetermined locations of the any PRB in the system common PRB grid are different, and are the left boundary and the right boundary, respectively. Certainly, the second predetermined location of the any PRB in the system common PRB grid may be another location of the any PRB. This is not limited in this embodiment.

It should be noted that, for FIG. 6, the any PRB in the system common PRB grid, which corresponds to the location information, may also be any PRB other than the second PRB numbered 2 in the system common PRB grid. For example, the any PRB in the system common PRB grid is the second PRB numbered 3, and in this case, the location information is used to indicate that the center frequency in the synchronization signal block PRB grid and a left boundary of the any PRB in the system common PRB grid with the first subcarrier spacing have an offset of 1.5 PRBs.

Example description 2: Using location information shown in FIG. 7 as an example, an upper grid in FIG. 7 represents a system common PRB grid with a subcarrier spacing of 15 kHz (that is, the foregoing first subcarrier spacing) in a system bandwidth of 10 MHz, and a lower grid in FIG. 7 represents a synchronization signal block PRB grid. In FIG. 7, a first predetermined location in the synchronization signal block PRB grid is a center frequency in the synchronization signal block PRB grid, that is, a frequency at which a solid line with an arrowhead between the second PRB numbered 1 and the second PRB numbered 2 in the synchronization signal block PRB grid is located. It is assumed that any PRB in the system common PRB grid in the location information is a PRB grid through which the solid line passes, that is, the third PRB numbered 6 in the system common PRB grid. The solid line and a left boundary of the second PRB numbered 6 in the system common PRB grid have an offset of 0 PRBs. Therefore, the location information in FIG. 7 may have a plurality of representation methods, and one representation method of which is that the location information is used to indicate that the center frequency in the synchronization signal block PRB grid and a left boundary of the any PRB in the system common PRB grid with the first subcarrier spacing have an offset of 0 PRBs.

In a second location information representation manner, the relative location relationship between the first predetermined location in the synchronization signal block PRB grid and any PRB in the system common PRB grid with the first subcarrier spacing is represented by using a quantity of subcarrier spacings. In other words, the location information is used to indicate that the first predetermined location in the synchronization signal block PRB grid and the any PRB in the system common PRB grid with the first subcarrier spacing have an offset of M number of subcarrier spacings, where M is greater than or equal to 0. For example, M is 0, 2, 4, 6, 8, or 10, that is, the location information indicates that M is 0, 2, 4, 6, 8, or 10; or M includes any one value of 0, 4, 6, and 10, that is, the location information indicates that M is 4, 6, or 10.

In the foregoing second location information representation manner, for example, M may be any one value of a preset value set. The preset value set may be agreed upon by the network device and the terminal device during initialization; or the preset value set is specified in a standard protocol, and the network device and the terminal device comply with the standard protocol. In short, the preset value set is known to both the network device and the terminal device. Values constituting the preset value set are not limited in this embodiment. For example, the preset value set may include 0 to 47, and the preset value set may be {0, 1, 2, 3, 4, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47}; or the preset value set may include even numbers in 0 to 47, and the preset value set is {0, 2, 4, 6, 8, 10, 12, 14, 16, 18, 20, 22, 24, 26, 28, 32, 34, 36, 38, 40, 42, 44, 46}; or the preset value set may include odd numbers in 0 to 47, and the preset value set is {1, 3, 5, 7, 9, 11, 13, 15, 17, 19, 21, 23, 25, 27, 29, 31, 33, 35, 37, 39, 41, 43, 45, 47}; or the preset value set may include at least two values in 0 to 47, for example, {0, 1}, {0, 1, 2, 3, 4, 5, 6, 7, 8, 9, 10} or {0, 6, 12, 18, 24, 30, 36, 42}. For another example, the preset value set may include 0 to 23, and the preset value set is {0, 1, 2, 3, 4, 5, 6, 7, 8, 9, 10, 11, 12, 13, 14 15, 16, 17, 18, 19, 20, 21, 22, 23}; or the preset value set may include even numbers in 0 to 23, and the preset value set is {0, 2, 4, 6, 8, 10, 12, 14, 16, 18, 20, 22}; or the preset value set includes odd numbers in 0 to 23, and the preset value set is {1, 3, 5, 7, 9, 11, 13, 15, 17, 19, 21, 23}; or the preset value set may include at least two values in 0 to 23, for example, {0, 1, 2, 3} or {0, 1, 2, 3, 4, 5, 6, 7, 8, 9, 10}. For another example, the preset value set includes at least two values in 0 to 11, and the preset value set is {0, 1, 2, 3, 4, 5, 6, 7, 8, 9, 10, 11}; or the preset value set includes even numbers in 0 to 11, and the preset value set is {0, 2, 4, 6, 8, 10}; or the preset value set includes odd numbers in 0 to 23, that is, the preset value set is {1, 3, 5, 7, 9, 11}. For another example, the preset value set is {0, 6, 12, 18, 24, 30, 36, 42}. It may be understood that the foregoing preset value sets are merely examples and not intended for limitation.

In an implementation in which M is any one value of the preset value set, the location information is a position of a value of M in the preset value set. The position may be a number of the value corresponding to M in the preset value set. For example, the preset value set is {0, 2, 4, 6, 8, 10}, and 3 bits are required to represent the location information, where 000 represents the first value in the preset value set, and M is 0; 001 represents the second value in the preset value set, and M is 2; 010 represents the third value in the preset value set, and M is 4; on represents the fifth value in the preset value set, and M is 8; 100 represents the sixth value in the preset value set, and M is 10. Therefore, for example, when the location information sent by the network device to the terminal device is on, it indicates that the first predetermined location in the synchronization signal block PRB grid and the any PRB in the system common PRB grid with the first subcarrier spacing have an offset of 8 subcarrier spacings.

In another implementation in which M is any one value of the preset value set, content included in the location information is M. For example, the preset value set is {0, 2, 4, 6, 8, 10} and 4 bits are required to represent the location information, where 0000 indicates that M is 0, 0010 indicates that M is 2, 0100 indicates that M is 4, 1000 indicates that M is 8, and low indicates that M is 10. Therefore, for example, when the location information sent by the network device to the terminal device is 1000, it indicates that the first predetermined location in the synchronization signal block PRB grid and the any PRB in the system common PRB grid with the first subcarrier spacing have an offset of 8 subcarrier spacings.

In the foregoing second location information representation manner, the location information is used to indicate that the first predetermined location in the synchronization signal block PRB grid and the any PRB in the system common PRB grid with the first subcarrier spacing have the offset of M number of subcarrier spacings. For example, the subcarrier spacing in the M number of subcarrier spacings may be a subcarrier spacing of the synchronization signal block PRB grid, or the subcarrier spacing in the M number of subcarrier spacings may be a subcarrier spacing of the system common PRB grid. This is not limited in this embodiment.

In another implementing manner, for the second location information representation manner, a value of M may meet one of the following formulas: M=U, M=U×2, M=U×2+1, and M=U×6, where U is the location information (for example, a value of the location information in decimal), or U may be equal to a value in 0, 1, 2, 3, . . . , 47, or U may be equal to a value in 0, 1, 2, 3, . . . , 23, or U may be equal to a value in 0, 1, 2, 3, . . . , 11, or U may be equal to a value in 0, 1, 2, 3, . . . , 7. The formula may be agreed upon by the network device and the terminal device during initialization; or the formula may be specified in a standard protocol, and the network device and the terminal device comply with the standard protocol. In short, both the network device and the terminal device have known the formula. Therefore, the value of M may be dynamically calculated based on bit values of system information. Using M=U×2 as an example, when the location information is U, the location information is used to indicate that the first predetermined location in the synchronization signal block PRB grid and the any PRB in the system common PRB grid with the first subcarrier spacing have an offset of M=(U×2) subcarrier spacings.

The following describes the location information in the second manner by using examples.

Figure 8A:
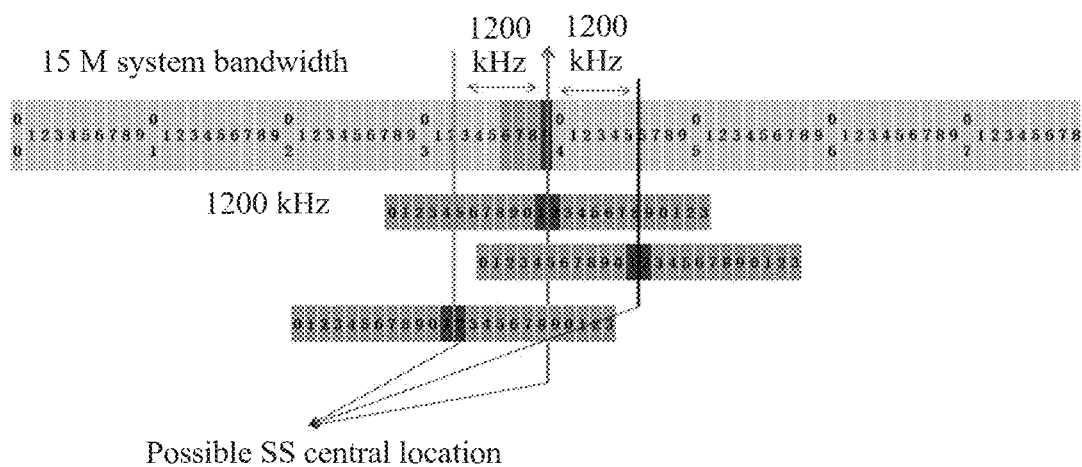

Example description 1: Using location information shown in FIG. 8A as an example, a grid in the first row in FIG. 8A represents a system common PRB grid with a subcarrier spacing of 15 kHz (that is, the foregoing first subcarrier spacing) in a system bandwidth of 15 MHz, and grids in the second to the fourth rows in FIG. 8A represent three different synchronization signal block PRB grids. In FIG. 8A, a first predetermined location in each of the three synchronization signal block PRB grids is a center frequency in the synchronization signal block PRB grid, that is, a frequency at which a solid line with an arrowhead between the second PRB numbered 1 and the second PRB numbered 2 in the synchronization signal block PRB grid is located. It is assumed that any PRB in the system common PRB grid in the location information is a PRB grid through which each of three solid lines passes. Corresponding to the three synchronization signal block PRB grids in the second to the fourth rows, the any PRB in the system common PRB grid is sequentially the third PRB numbered 9 and the third PRB numbered 2 in the synchronization signal block PRB grid. It can be learned through calculation that, for the synchronization signal block PRB grid in the second row, the location information is used to indicate that the center frequency in the synchronization signal block PRB grid and a left boundary of the any PRB in the system common PRB grid with the first subcarrier spacing have an offset of 10 subcarrier spacings; for the synchronization signal block PRB grid in the third row, the location information is used to indicate that the center frequency in the synchronization signal block PRB grid and a left boundary of the any PRB in the system common PRB grid with the first subcarrier spacing have an offset of 2 subcarrier spacings; for the synchronization signal block PRB grid in the fourth row, the location information is used to indicate that the center frequency in the synchronization signal block PRB grid and a left boundary of the any PRB in the system common PRB grid with the first subcarrier spacing have an offset of 6 subcarrier spacings.

Figure 8B:
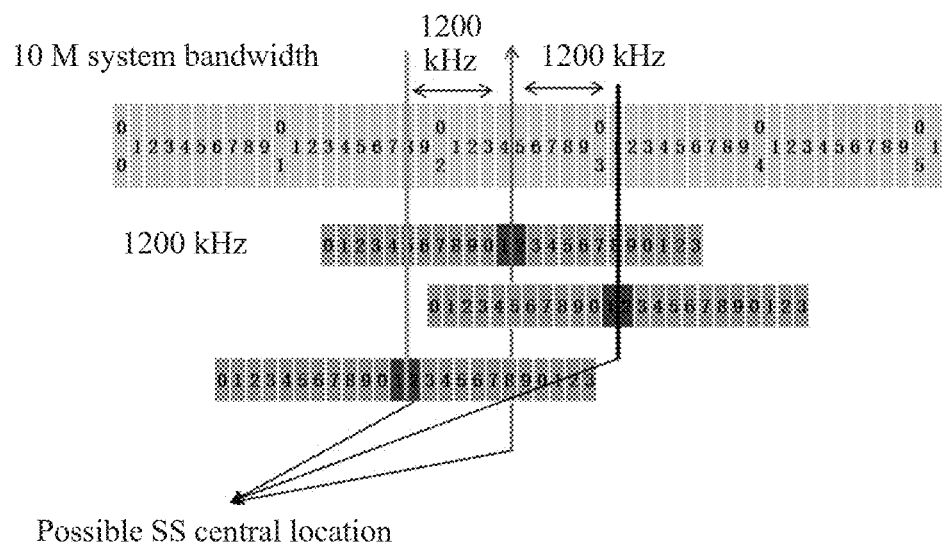

Example description 2: Using location information shown in FIG. 8B as an example, a grid in the first row in FIG. 8B represents a system common PRB grid with a subcarrier spacing of 15 kHz (that is, the foregoing first subcarrier spacing) in a system bandwidth of 10 MHz, and grids in the second to the fourth rows in FIG. 8B represent three different synchronization signal block PRB grids. Assumptions about a first predetermined location and any PRB are similar to those in FIG. 8A. In FIG. 8B, it can be learned through calculation that, for the synchronization signal block PRB grid in the second row, the location information is used to indicate that a center frequency in the synchronization signal block PRB grid and a left boundary of the any PRB in the system common PRB grid with the first subcarrier spacing have an offset of 0 subcarrier spacings; for the synchronization signal block PRB grid in the third row, the location information is used to indicate that a center frequency in the synchronization signal block PRB grid and a left boundary of the any PRB in the system common PRB grid with the first subcarrier spacing have an offset of 8 subcarrier spacings; for the synchronization signal block PRB grid in the fourth row, the location information is used to indicate that a center frequency in the synchronization signal block PRB grid and a left boundary of the any PRB in the system common PRB grid with the first subcarrier spacing have an offset of 4 subcarrier spacings.

In a third location information representation manner, the relative location relationship between the first predetermined location in the synchronization signal block PRB grid and the any PRB in the system common PRB grid with the first subcarrier spacing is represented by using a quantity of PRBs and a quantity of subcarrier spacings. In a first example, the location information is used to indicate that the first predetermined location and the second predetermined location of the any PRB have an offset of M number of subcarrier spacings plus N PRBs, where both M and N are greater than or equal to 0. Alternatively, in a second example, the location information is used to indicate that the first predetermined location and the second predetermined location have an offset of M third subcarrier spacings plus N×12 fourth subcarrier spacings, M is a quantity of the third subcarrier spacings, N×12 is a quantity of the fourth subcarrier spacings, where the third subcarrier spacing is a subcarrier spacing corresponding to M number of subcarrier spacings, and the fourth subcarrier spacing is a subcarrier spacing corresponding to the N PRBs. Alternatively, in a third example, the location information is used to indicate that the first predetermined location and the second predetermined location have an offset of M+N×12×A third subcarrier spacings, where the third subcarrier spacing is a subcarrier spacing corresponding to M number of subcarrier spacings, and A is 1, 2, 4, 8, or 16.

In the third location information representation manner, for related explanations and descriptions about M, N, the PRB, and the subcarrier spacing, refer to the foregoing first location information representation manner and the foregoing second location information representation manner. Details are not described herein again.

The following describes the location information in the third manner by using an example.

Example description: Using location information shown in FIG. 6 as an example, an upper grid in FIG. 6 represents a system common PRB grid with a subcarrier spacing of 15 kHz (that is, the foregoing first subcarrier spacing) in a system bandwidth of 5 MHz, and a lower grid in FIG. 6 represents a synchronization signal block PRB grid. In FIG. 6, a first predetermined location in the synchronization signal block PRB grid is a center frequency in the synchronization signal block PRB grid, that is, a frequency at which a dashed line with an arrowhead between the second PRB numbered 1 and the second PRB numbered 2 in the synchronization signal block PRB grid is located. It is assumed that any PRB in the system common PRB grid in the location information is any PRB other than the second PRB numbered 2 in the system common PRB grid. For example, the any PRB in the system common PRB grid is the second PRB numbered 3. In this case, the location information is used to indicate that the center frequency in the synchronization signal block PRB grid and a left boundary of the any PRB in the system common PRB grid with the first subcarrier spacing have an offset of 6 subcarrier spacings plus 1 PRB.

Figure 26:
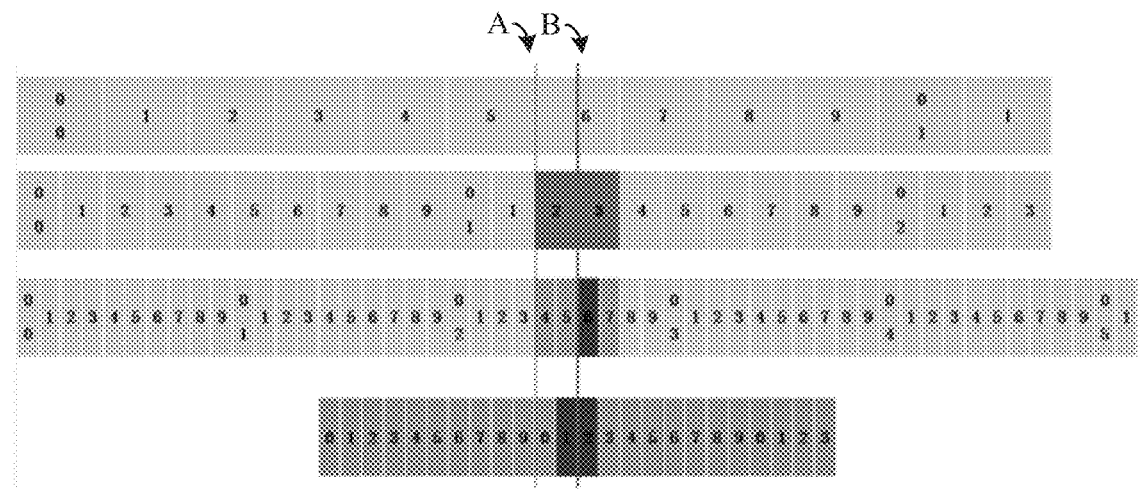
FIG. 26 to FIG. 28 are schematic structural diagrams of other several synchronization signal block PRB grids and system common PRB grids according to an embodiment of this application.

Referring to FIG. 26, the location information in the first manner or the location information in the second manner above may be applied to an embodiment shown in FIG. 26. In FIG. 26, a grid in the first row is a system common PRB grid with a subcarrier spacing of 60 kHz, a grid in the second row is a system common PRB grid with a subcarrier spacing of 30 kHz, a grid in the third row is a system common PRB grid with a subcarrier spacing of 15 kHz, and a grid in the fourth row is a synchronization signal block PRB grid with a subcarrier spacing of 15 kHz. A vertical line B in FIG. 26 is a first predetermined location in the synchronization signal block PRB grid, and the first predetermined location is a center frequency in the synchronization signal block PRB grid.

For example, in the system common PRB grid with the subcarrier spacing of 60 kHz, a PRB in the system common PRB grid with the subcarrier spacing of 60 kHz that corresponds to the first predetermined location (that is, the vertical line B) in the synchronization signal block PRB grid is a specified PRB, that is, a PRB numbered 6 in the system common PRB grid with the subcarrier spacing of 60 kHz in FIG. 26. A left boundary location of the specified PRB is a second predetermined location, that is, a location of a vertical line A in FIG. 26. In this case, the first predetermined location (that is, the vertical line B) and the second predetermined location (that is, the vertical line A) have an offset of 2 PRBs or 24 subcarrier spacings. For example, location information is used to indicate that the center frequency in the synchronization signal block PRB grid and the boundary location of the PRB grid with the subcarrier spacing of 60 kHz have an offset of 2 PRBs or 24 subcarrier spacings. The offset subcarrier spacing is a subcarrier spacing of a synchronization signal block.

For example, in the system common PRB grid with the subcarrier spacing of 30 kHz, a PRB in the system common PRB grid with the subcarrier spacing of 30 kHz that corresponds to the first predetermined location in the synchronization signal block PRB grid is a specified PRB, that is, a PRB numbered 3 in the system common PRB grid with the subcarrier spacing of 30 kHz in FIG. 26. A left boundary location of the specified PRB is a second preset location. In this case, the first predetermined location and the second predetermined location have an offset of 0 subcarrier spacings. For example, location information is used to indicate that the center frequency in the synchronization signal block PRB grid and the boundary location of the PRB grid with the subcarrier spacing of 30 kHz have an offset of 0 subcarrier spacings, and the offset subcarrier spacing is a subcarrier spacing of a synchronization signal block.

For example, in the system common PRB grid with the subcarrier spacing of 15 kHz, a PRB in the system common PRB grid with the subcarrier spacing of 15 kHz that corresponds to the first predetermined location in the synchronization signal block PRB grid is a specified PRB, that is, a PRB numbered 6 in the system common PRB grid with the subcarrier spacing of 15 kHz in FIG. 26. A left boundary location of the specified PRB is a second preset location. In this case, the first predetermined location and the second predetermined location have an offset of 0 subcarrier spacings. In an implementation, location information is used to indicate that the center frequency in the synchronization signal block PRB grid and the boundary location of the PRB grid with the subcarrier spacing of 15 kHz have an offset of 0 subcarrier spacings, and the offset subcarrier spacing is a subcarrier spacing of a synchronization signal block.

Figure 27:
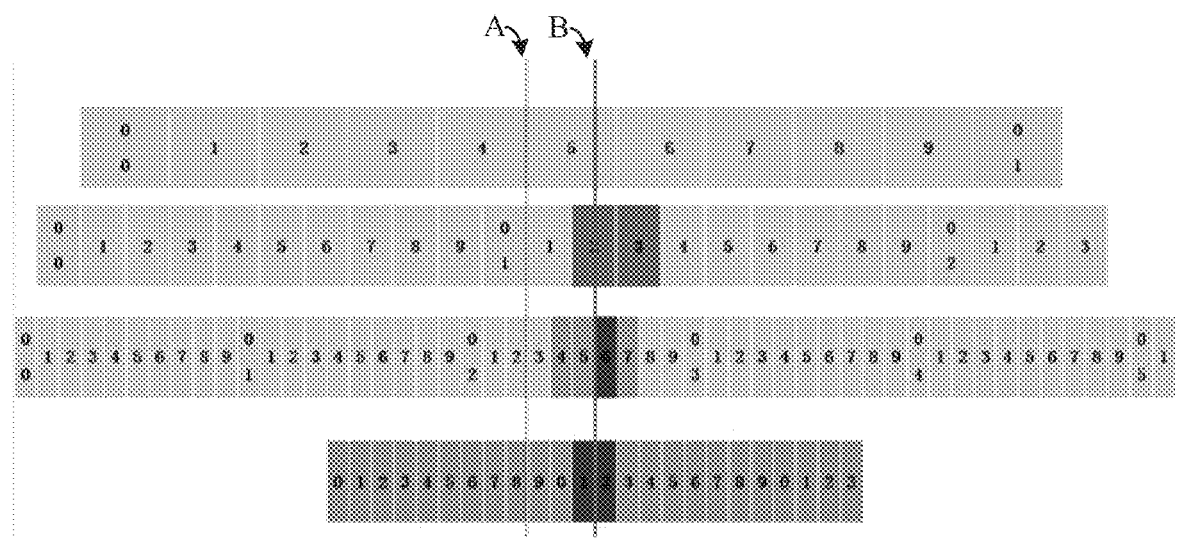

Referring to FIG. 27, the location information in the first manner or the location information in the second manner above may be applied to an embodiment shown in FIG. 27. In FIG. 27, a grid in the first row is a system common PRB grid with a subcarrier spacing of 60 kHz, a grid in the second row is a system common PRB grid with a subcarrier spacing of 30 kHz, a grid in the third row is a system common PRB grid with a subcarrier spacing of 15 kHz, and a grid in the fourth row is a synchronization signal block PRB grid with a subcarrier spacing of 15 kHz. A vertical line B in FIG. 27 is a first predetermined location in the synchronization signal block PRB grid, and the first predetermined location is a center frequency in the synchronization signal block PRB grid.

For example, in the system common PRB grid with the subcarrier spacing of 60 kHz, a PRB in the system common PRB grid with the subcarrier spacing of 60 kHz that corresponds to the first predetermined location in the synchronization signal block PRB grid is a specified PRB, that is, a PRB numbered 5 in the system common PRB grid with the subcarrier spacing of 60 kHz in FIG. 27. A left boundary location of the specified PRB is a second preset location, that is, a location of a vertical line A in the system common PRB grid with the subcarrier spacing of 60 kHz in FIG. 27. In this case, the first predetermined location and the second predetermined location have an offset of 3 PRBs or 36 subcarrier spacings. For example, location information is used to indicate that the center frequency in the synchronization signal block PRB grid and the boundary location of the PRB grid with the subcarrier spacing of 60 kHz have an offset of 3 PRBs or 36 subcarrier spacings, and the offset subcarrier spacing is a subcarrier spacing of a synchronization signal block.

For example, in the system common PRB grid with the subcarrier spacing of 30 kHz, a PRB in the system common PRB grid with the subcarrier spacing of 30 kHz that corresponds to the first predetermined location in the synchronization signal block PRB grid is a specified PRB, that is, a PRB numbered 2 in the system common PRB grid with the subcarrier spacing of 30 kHz in FIG. 27. A left boundary location of the specified PRB is a second preset location. In this case, the first predetermined location and the second predetermined location have an offset of 12 subcarrier spacings or 1 PRB. For example, location information is used to indicate that the center frequency in the synchronization signal block PRB grid and the boundary location of the PRB grid with the subcarrier spacing of 30 kHz have an offset of 12 subcarrier spacings or 1 PRB, and the offset subcarrier spacing is a subcarrier spacing of a synchronization signal block.

For example, in the system common PRB grid with the subcarrier spacing of 15 kHz, a PRB in the system common PRB grid with the subcarrier spacing of 15 kHz that corresponds to the first predetermined location in the synchronization signal block PRB grid is a specified PRB, that is, a PRB numbered 6 in the system common PRB grid with the subcarrier spacing of 15 kHz in FIG. 27. A left boundary location of the specified PRB is a second preset location. In this case, the first predetermined location and the second predetermined location have an offset of 0 subcarrier spacings. For example, location information is used to indicate that the center frequency in the synchronization signal block PRB grid and the boundary location of the PRB grid with the subcarrier spacing of 15 kHz have an offset of 0 subcarrier spacings, and the offset subcarrier spacing is a subcarrier spacing of a synchronization signal block.

Figure 28:
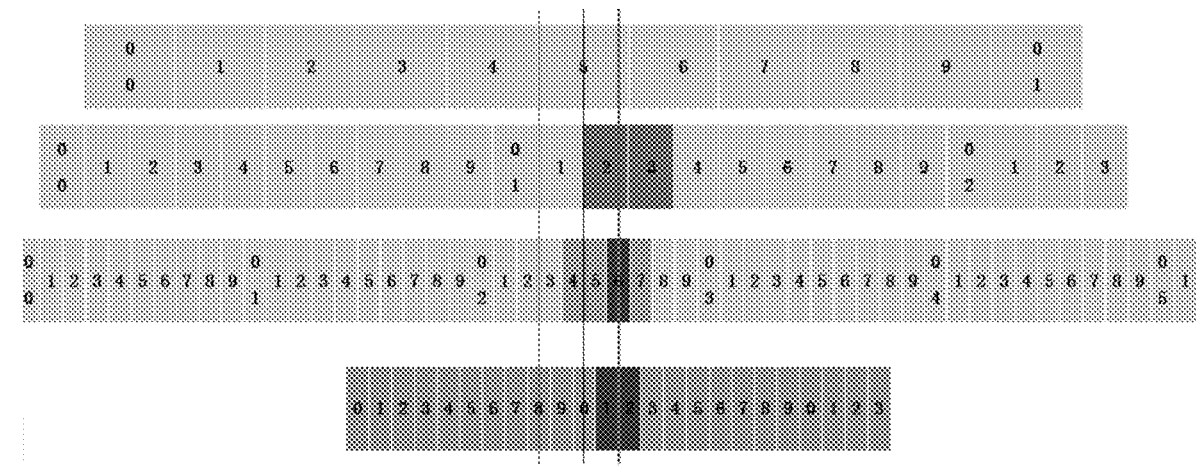

Referring to FIG. 28, the location information in the first manner or the location information in the second manner above may be applied to an embodiment shown in FIG. 28. In FIG. 28, a grid in the first row is a system common PRB grid with a subcarrier spacing of 60 kHz, a grid in the second row is a system common PRB grid with a subcarrier spacing of 30 kHz, a grid in the third row is a system common PRB grid with a subcarrier spacing of 15 kHz, and a grid in the fourth row is a synchronization block PRB grid with a subcarrier spacing of 15 kHz. The third vertical line from the left in FIG. 28 is a first predetermined location in the synchronization block PRB grid, and the first predetermined location is a center frequency in the synchronization block PRB grid.

For example, in the system common PRB grid with the subcarrier spacing of 60 kHz, a PRB in the system common PRB grid with the subcarrier spacing of 60 kHz that corresponds to the first predetermined location in the synchronization block PRB grid is a specified PRB, that is, a PRB numbered 5 in the system common PRB grid with the subcarrier spacing of 60 kHz in FIG. 28. A left boundary location of the specified PRB is a second preset location, that is, a location of the first vertical line from the left in the system common PRB grid with the subcarrier spacing of 60 kHz in FIG. 27. In this case, the first predetermined location and the second predetermined location have an offset of 3.5 PRBs or 42 subcarrier spacings. In an implementation, location information is used to indicate that the center frequency in the synchronization signal block PRB grid and the boundary location of the PRB grid with the subcarrier spacing of 60 kHz have an offset of 3.5 PRBs or 42 subcarrier spacings, and the offset subcarrier spacing is a subcarrier spacing of a synchronization signal block.

For example, in the system common PRB grid with the subcarrier spacing of 30 kHz, a PRB in the system common PRB grid with the subcarrier spacing of 30 kHz that corresponds to the first predetermined location in the synchronization block PRB grid is a specified PRB, that is, a PRB numbered 2 in the system common PRB grid with the subcarrier spacing of 30 kHz in FIG. 28. A left boundary location of the specified PRB is a second preset location. In this case, the first predetermined location and the second predetermined location have an offset of 18 subcarrier spacings or 1.5 PRBs. In an implementation, location information is used to indicate that the center frequency in the synchronization signal block PRB grid and the boundary location of the PRB grid with the subcarrier spacing of 30 kHz have an offset of 18 subcarrier spacings or 1.5 PRBs, and the offset subcarrier spacing is a subcarrier spacing of a synchronization signal block.

For example, in the system common PRB grid with the subcarrier spacing of 15 kHz, a PRB in the system common PRB grid with the subcarrier spacing of 15 kHz that corresponds to the first predetermined location in the synchronization block PRB grid is a specified PRB, that is, a PRB numbered 6 in the system common PRB grid with the subcarrier spacing of 15 kHz in FIG. 28. A left boundary location of the specified PRB is a second preset location. In this case, the first predetermined location and the second predetermined location have an offset of 6 subcarrier spacings or 0.5 PRB. In an implementation, location information is used to indicate that the center frequency in the synchronization signal block PRB grid and the boundary location of the PRB grid with the subcarrier spacing of 15 kHz have an offset of 6 subcarrier spacings or 0.5 PRB, and the offset subcarrier spacing is a subcarrier spacing of a synchronization signal block.

In this embodiment, the terminal device performs step 502 after receiving the location information sent by the network device in step 501.

Step 502: The terminal device determines a second predetermined location of any PRB in a system common PRB grid with a first subcarrier spacing based on a first predetermined location in a synchronization signal block PRB grid and the location information, where the second predetermined location is used to determine a location of a PRB included in the system common PRB grid.

In step 502, the second predetermined location of the any PRB in the system common PRB grid is a location in a predefined system common PRB grid, and the second predetermined location in the system common PRB grid may be set as any location in the system common PRB grid and is not limited in this embodiment. For example, the second predetermined location of the any PRB in the system common PRB grid may be a boundary location or a central location of the any PRB. Further, the boundary location may be a left or right boundary. In an implementing manner, the central location is the seventh subcarrier of a PRB.

In step 502, it is assumed that the location information is used to indicate that the center frequency in the synchronization signal block PRB grid and the left boundary of the any PRB in the system common PRB grid with the first subcarrier spacing have an offset of N PRBs, where N is greater than or equal to 0. For example, N includes but is not limited to 0 or 0.5. For example, the location information indicates that N is 0 or 0.5. Because the center frequency is known, it can be learned based on the location information that a frequency with the offset of N PRBs from the center frequency is a frequency corresponding to the left boundary of the any PRB in the system common PRB grid. Therefore, the frequency corresponding to the left boundary of the any PRB in the system common PRB grid can be obtained. Because the first subcarrier spacing of the system common PRB grid is known, and a quantity of subcarriers included in one PRB in the system common PRB grid is fixed, a width of one PRB in the system common PRB grid is known, and the width of the PRB in the system common PRB grid is equal to a product of the first subcarrier spacing and the fixed quantity of subcarriers included in the PRB. When the frequency corresponding to the left boundary of the any PRB in the system common PRB grid and the width of the PRB in the system common PRB grid are known, the location of the PRB included in the system common PRB grid can be determined, and the location of the PRB may be represented by using a frequency.

In this embodiment, that the terminal device determines the location of the PRB included in the system common PRB grid may apply to a plurality of scenarios. In a scenario, assuming that the network device schedules the terminal device in a location at a distance of Q PRBs from the any PRB in the system common PRB grid, the terminal device may determine the location at the distance of Q PRBs from the any PRB based on the second predetermined location of the any PRB in the system common PRB grid with the first subcarrier spacing and the width of the PRB, where Q is an integer greater than or equal to 0; and then the terminal device may receive scheduling from the network device in the scheduling location.

Using the location information shown in FIG. 6 as an example, the location information is used to indicate that the center frequency in the synchronization signal block PRB grid and the left boundary of the any PRB in the system common PRB grid with the first subcarrier spacing have an offset of 0.5 PRB, and in this case, the terminal device can determine the frequency at which the left boundary of the any PRB is located. Assuming that the network device schedules the terminal device in a location at a distance of 1 PRB from the left of the any PRB in the system common PRB grid, the terminal device may determine, based on the frequency at which the left boundary of the any PRB is located and the width of the PRB, a frequency corresponding to a PRB at which the network device schedules the terminal device.

Figure 9:
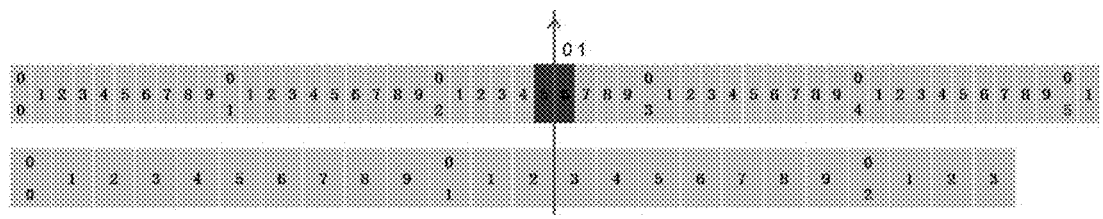
FIG. 9 is a schematic structural diagram of another system common PRB grid according to an embodiment of this application.

In this embodiment, according to the foregoing method, the second predetermined location of the any PRB in the system common PRB grid with the first subcarrier spacing can be determined, so that the location of the PRB included in the system common PRB grid can be determined. There is a multiple relationship between widths of PRBs corresponding to different subcarrier spacings in a same system bandwidth. For example, for a same system bandwidth, one PRB with a subcarrier spacing of 30 kHz is twice the width of one PRB with a subcarrier spacing of 15 kHz; one PRB with a subcarrier spacing of 60 kHz is four times the width of one PRB with a subcarrier spacing of 15 kHz. Therefore, based on the multiple relationship, a location of a PRB included in a system common PRB grid with a second subcarrier spacing can be determined based on the location of the PRB included in the system common PRB grid with the first subcarrier spacing. The system common PRB grid with the second subcarrier spacing and the system common PRB grid with the first subcarrier spacing belong to a same system bandwidth but have different subcarrier spacings. Using the system common PRB grid shown in FIG. 9 as an example, for a same system bandwidth, the first row in FIG. 9 is a first system common PRB grid with a subcarrier spacing of 30 kHz, and the second row in FIG. 9 is a second system common PRB grid with a subcarrier spacing of 60 kHz. It is assumed that a location of a left boundary of a PRB numbered 3 through which a solid line with an arrowhead in the second system common PRB grid passes is known, and the PRB with the subcarrier spacing of 60 kHz is twice the width of the PRB with the subcarrier spacing of 30 kHz. Therefore, a location of a PRB in the second system common PRB grid can be determined.

In view of the above, in the PRB grid indication method shown in FIG. 5 and provided in this embodiment of this application, the network device sends the location information to the terminal device, where the location information is used to indicate the relative location relationship between the first predetermined location in the synchronization signal block PRB grid and the any PRB in the system common PRB grid with the first subcarrier spacing; and the terminal device may determine the second predetermined location of the any PRB in the system common PRB grid with the first subcarrier spacing based on the first predetermined location in the synchronization signal block PRB grid and the location information, where the second predetermined location is used to determine the location of the PRB included in the system common PRB grid. Therefore, the terminal device in a 5G system can obtain the PRB location in the system common PRB grid.

Figure 10:
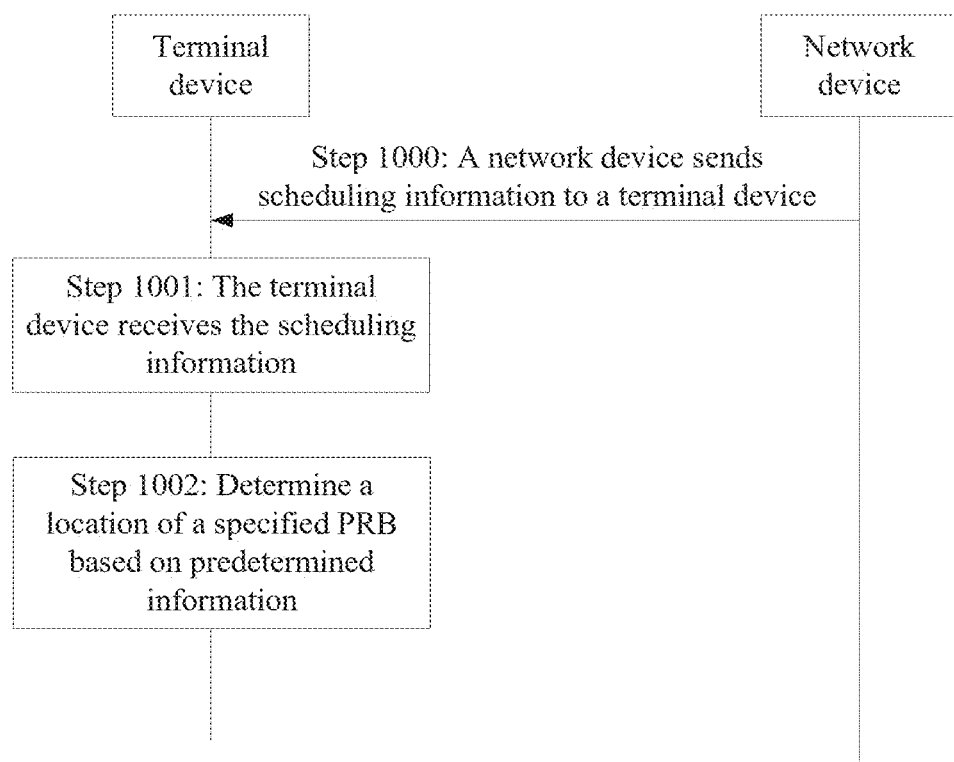
FIG. 10 is a schematic flowchart of another PRB grid indication method according to an embodiment of this application.

An embodiment of this application further provides a PRB grid indication method, and the method is used by a terminal device in a 5G system to obtain a relationship between system common PRB grids corresponding to different subcarrier spacings in a same system bandwidth. FIG. 10 is a schematic flowchart of a PRB grid indication method, and the method includes the following steps.

Step 1000: A network device sends scheduling information to a terminal device, where the scheduling information is used by the network device to schedule the terminal device on a specified PRB.

Step 1001: The terminal device receives the scheduling information sent by the network device.

In step 1001, the scheduling information is used by the network device to schedule the terminal device on the specified PRB, and the specified PRB is a PRB in a system common PRB grid with a subcarrier spacing in a system bandwidth. In this case, the system bandwidth and the subcarrier spacing that correspond to the specified PRB are known, and a sequence number of the specified PRB in the system common PRB grid is also known.

Step 1002: The terminal device determines a location of the specified PRB based on predetermined information.

In step 1002, the predetermined information is used to indicate a location of a PRB in system common PRB grids with the different subcarrier spacings in any one of at least one system bandwidth. The predetermined information is based on system common PRB grids with different subcarrier spacings in different system bandwidths that are defined in this embodiment. A description manner of the predetermined information is not limited in this embodiment, provided that the system common PRB grids with the different subcarrier spacings in the different system bandwidths can be obtained by using the predetermined information. For example, the predetermined information may have the following two description manners:

Manner 1: The predetermined information is used to indicate a location of a PRB in the system common PRB grids with the different subcarrier spacings in the any one of the at least one system bandwidth.

In this manner, the predetermined information directly indicates a location of a PRB in the system common PRB grids with the different subcarrier spacings in the different system bandwidths, and a location of a PRB in each system common PRB grid may be described in a plurality of manners. For example, the predetermined information describes a frequency of a left or right boundary of a start PRB in a system common PRB grid. For another example, the predetermined information describes a frequency of a left or right boundary of an $N^{th}$ PRB in a system common PRB grid. N is a positive integer, and is not limited in this embodiment.

Manner 2: The predetermined information is used to indicate a location of a PRB in a first system common PRB grid and a relative location relationship between the first system common PRB grid and a second system common PRB grid, where the first system common PRB grid and the second system common PRB grid belong to a same system bandwidth in the at least one system bandwidth, and a subcarrier spacing of the first system common PRB grid and a subcarrier spacing of the second system common PRB grid are different.

In this manner, the predetermined information does not directly indicate a location of a PRB in the system common PRB grids with the different subcarrier spacings in the different system bandwidths, but indicates a location of a PRB in the first system common PRB grid with a subcarrier spacing in a system bandwidth and indicates the relative location relationship between the first system common PRB grid and the second system common PRB grid. According to the relative location relationship, a location of a PRB in the second system common PRB grid can be derived based on the location of the PRB in the first system common PRB grid.

Similarly, the location of the PRB in the first system common PRB grid may be described in a plurality of manners. For example, the predetermined information describes a frequency of a left or right boundary of a start PRB in the first system common PRB grid. For another example, the predetermined information describes a frequency of a left or right boundary of an $N^{th}$ PRB in the first system common PRB grid. N is a positive integer, and is not limited in this embodiment.

The relative location relationship between the second system common PRB grid and the first system common PRB grid may also have a plurality of implementations, provided that according to the relative location relationship, the location of the PRB in the second system common PRB grid can be derived based on the location of the PRB in the first system common PRB grid. This is not limited in this embodiment. For example, the relative location relationship between the second system common PRB grid and the first system common PRB grid may be that a left boundary of a start PRB in the second system common PRB grid and a left boundary of a start PRB in the first system common PRB grid have a left offset of several PRBs or several subcarrier spacings. For another example, the relative location relationship between the second system common PRB grid and the first system common PRB grid may be that a left boundary of a PRB at a central location in the second system common PRB grid and a left boundary of a PRB at a central location in the first system common PRB grid have a left offset of several PRBs or several subcarrier spacings.

Therefore, the terminal device can determine the location of the specified PRB based on the predetermined information, that is, the system common PRB grids with the different subcarrier spacings in the different system bandwidths that are defined in this embodiment.

For details about the system common PRB grids with the different subcarrier spacings in the different system bandwidths that are defined in this embodiment, refer to schematic structural diagrams of system common PRB grids shown in FIG. 11 to FIG. 18.

Figure 11:
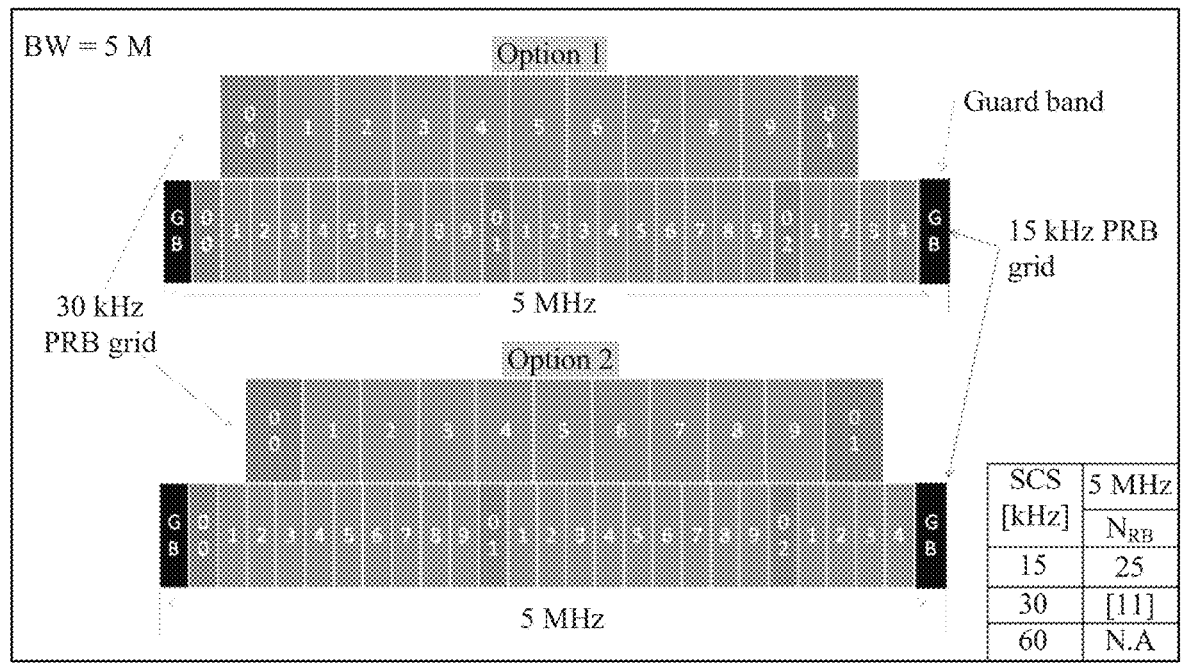
FIG. 11 to FIG. 18 are schematic structural diagrams of system common PRB grids with different subcarrier spacings in different system bandwidths that are defined in an embodiment of this application.

A structure of a system common PRB grid shown in FIG. 11 is used as an example. Option 1 in FIG. 11 includes two rows of system common PRB grids, which are sequentially a first system common PRB grid and a second system common PRB grid from top to bottom. For the first system common PRB grid and the second system common PRB grid, system bandwidths are both 5 MHz, and subcarrier spacings are sequentially 30 kHz and 15 kHz. For a structure of the system common PRB grid shown in Option 1 in FIG. 11, the predetermined information in this embodiment may include the first system common PRB grid and the second system common PRB grid; or the predetermined information may include the first system common PRB grid. A left boundary of the first PRB in the first system common PRB grid with the subcarrier spacing of 30 kHz is aligned with a left boundary of the first PRB in the second system common PRB grid with the subcarrier spacing of 15 kHz. In FIG. 11, Option 1 and Option 2 are two possible grid structures of system common PRB grids with different subcarrier spacings in the system bandwidth of 5 MHz.

Figure 12:
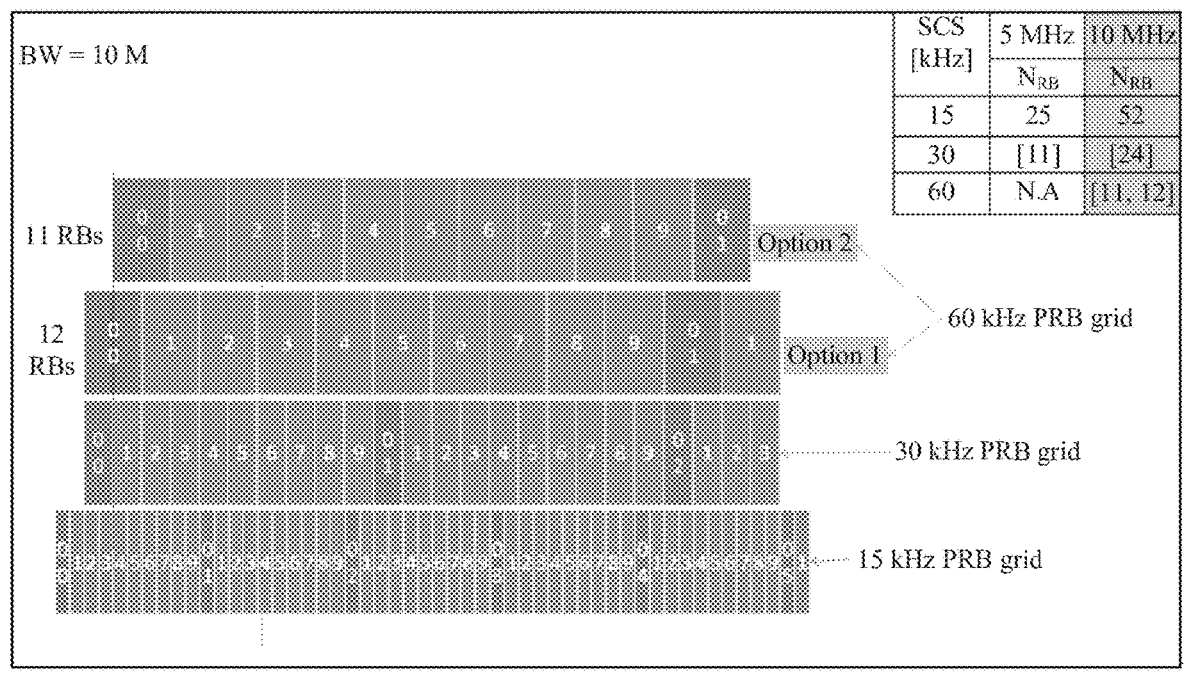
Figure 13:
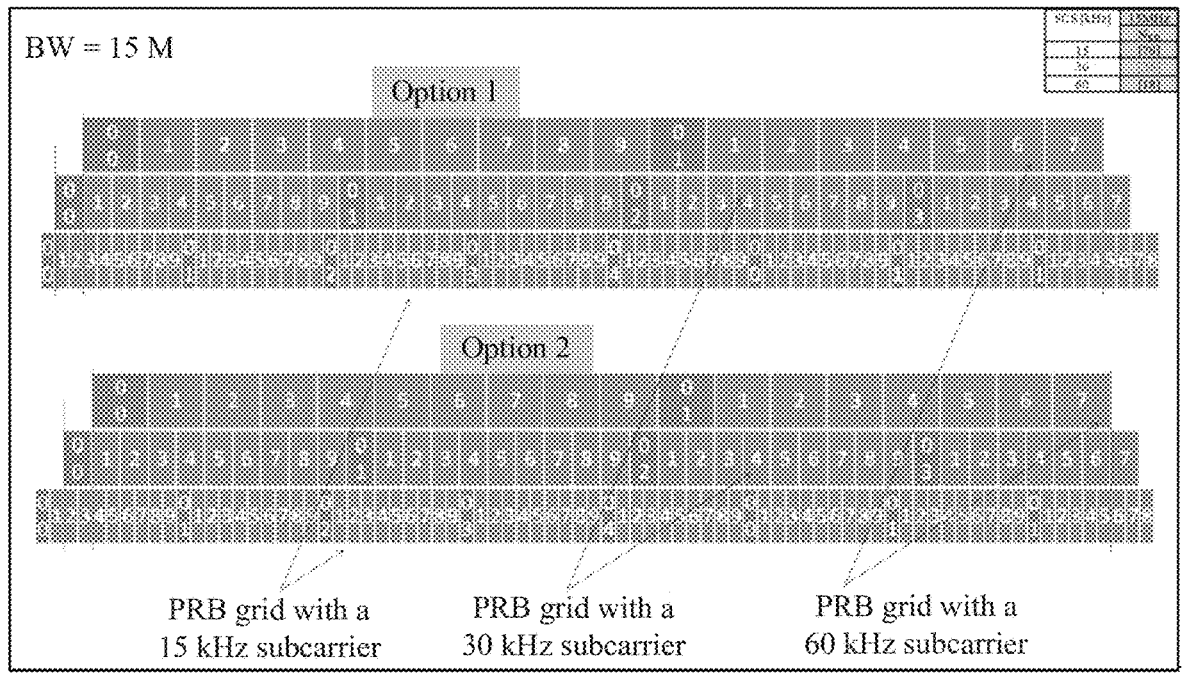
Figure 14:
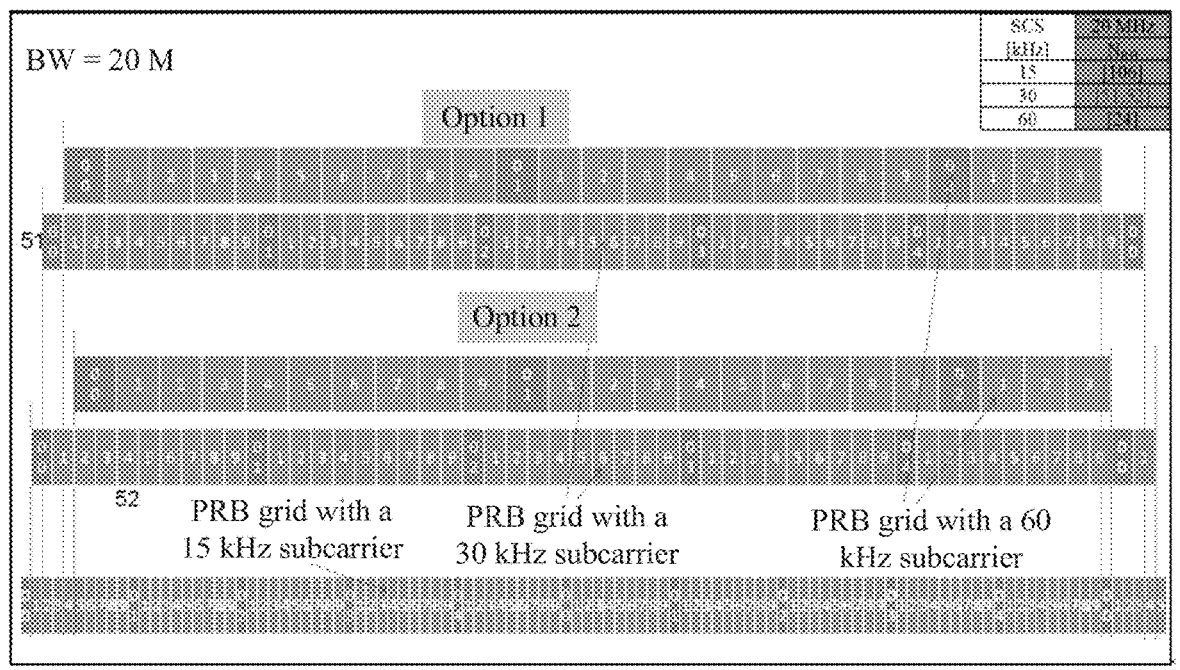
Figures 15, 16:
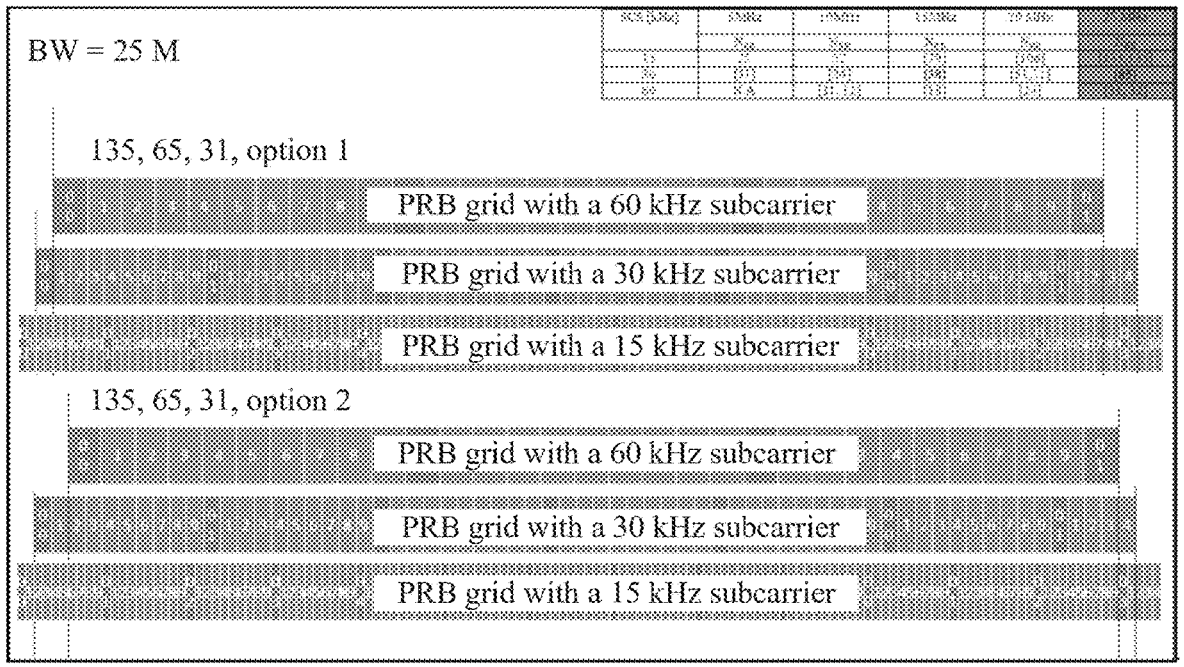
Figure 17:
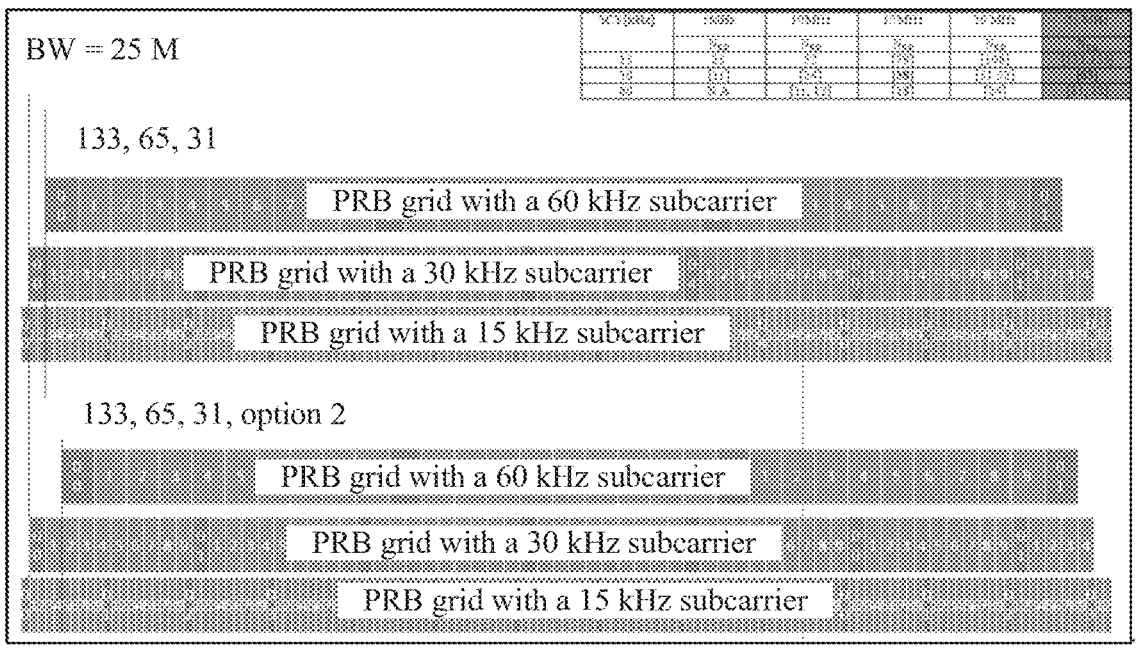
Figure 18:
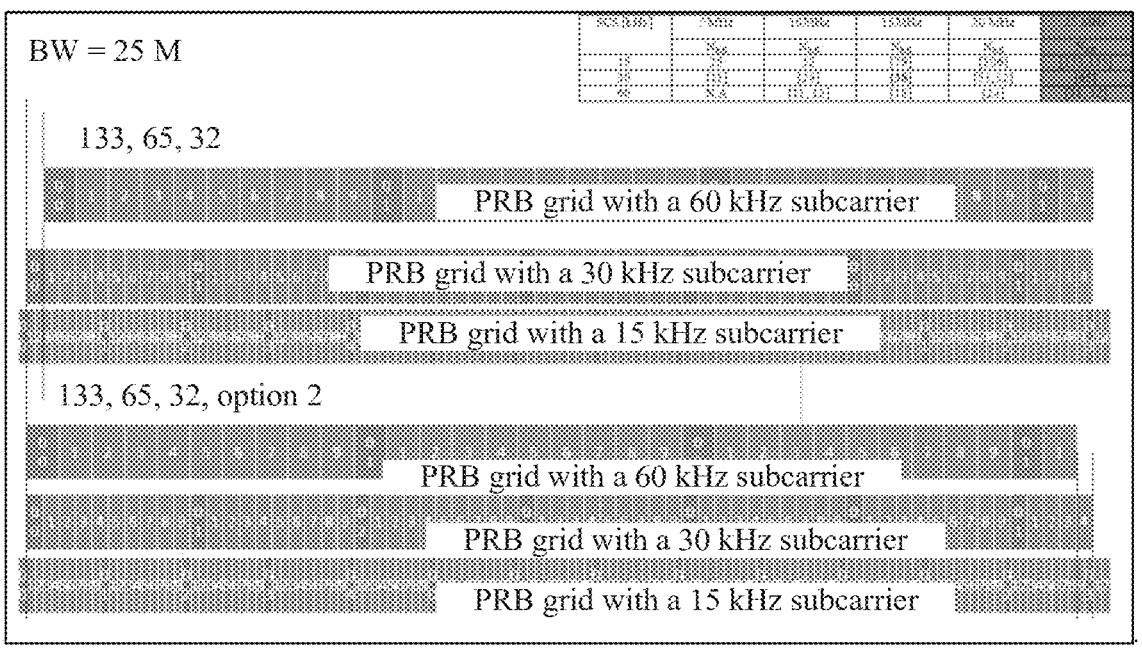

A structure of a system common PRB grid shown in FIG. 12 is used as an example. FIG. 12 is a schematic structural diagram of system common PRB grids with different subcarrier spacings in a system bandwidth of 10 MHz, and Option 1 and Option 2 are two system common PRB grids with subcarrier spacings of 60 kHz. The system common PRB grid with the subcarrier spacing of 60 kHz shown in Option 1 is used as an example. The predetermined information may include system common PRB grids with subcarrier spacings of 60 kHz, 30 kHz, and 15 kHz, respectively in the system bandwidth of 10 MHz; or the predetermined information may include a system common PRB grid with the subcarrier spacing of 60 kHz in the system bandwidth of 10 MHz. A left boundary of the first PRB (numbered 00) in a system common PRB grid with the subcarrier spacing of 60 kHz is aligned with a left boundary of the first PRB (numbered 1) in a system common PRB grid with the subcarrier spacing of 30 kHz, and the left boundary of the first PRB (numbered 00) in the system common PRB grid with the subcarrier spacing of 60 kHz is aligned with a left boundary of the fifth PRB (numbered 4) in a system common PRB grid with the subcarrier spacing of 15 kHz.

FIG. 13 to FIG. 18 can all represent a relative location relationship between system common PRB grids with different subcarrier spacings in a same system bandwidth. System bandwidths corresponding to FIG. 13 to FIG. 18 are sequentially 15 MHz, 20 MHz, 25 MHz, 25 MHz, 25 MHz, and 25 MHz.

It should be noted that, the system common PRB grids with the different subcarrier spacings in the different system bandwidths that are defined in this embodiment may be specified in a protocol, and in this case, the network device and the terminal device have known the system common PRB grids defined in this embodiment. Alternatively, the network device has known the system common PRB grids defined in this embodiment, and the network device notifies the terminal device of the system common PRB grids defined in this embodiment. Alternatively, the network device has known the system common PRB grids defined in this embodiment, the network device determines the location of the specified PRB based on the defined system common PRB grids, and the network device sends the location of the specified PRB to the terminal device. This is not limited in this embodiment.

In view of the above, in the PRB grid indication method shown in FIG. 10 and provided in this embodiment of this application, the terminal device may determine a location of any PRB based on the system common PRB grids with the different subcarrier spacings in the different system bandwidths that are defined in this embodiment. It should be noted that, the system common PRB grids with the different subcarrier spacings in the different system bandwidths that are defined in this embodiment can not only apply to a scenario in which the network device schedules the terminal device, but can also apply to another scenario. This is not limited in this embodiment.

Figure 19:
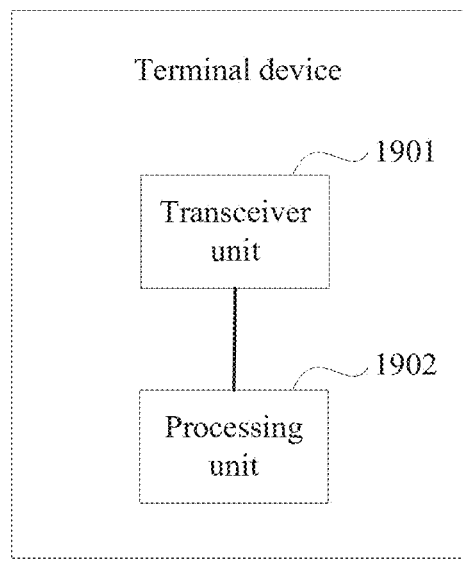
FIG. 19 is a schematic structural diagram of a first terminal device according to an embodiment of this application.

Based on a same inventive concept, an embodiment of this application further provides a terminal device. The terminal device can implement the method performed by the terminal device in the method provided in the embodiment corresponding to FIG. 10. Referring to FIG. 19, the terminal device includes a transceiver unit 1901 and a processing unit 1902.

The transceiver unit 1901 is configured to receive location information sent by a network device, where the location information is used to indicate a relative location relationship between a first predetermined location in a synchronization signal block PRB grid and any PRB in a system common PRB grid with a first subcarrier spacing.

The processing unit 1902 is configured to determine a second predetermined location of the any PRB based on the first predetermined location and the location information, where the second predetermined location is used to determine a location of a PRB included in the system common PRB grid.

In a possible implementation, when receiving the location information sent by the network device, the transceiver unit 1901 is specifically configured to:
  receive a broadcast message carried on a physical broadcast channel and sent by the network device, where the broadcast message carries the location information.

In a possible implementation, that the location information is used to indicate a relative location relationship between a first predetermined location in a synchronization signal block PRB grid and any PRB in a system common PRB grid with a first subcarrier spacing is specifically:
  the location information is used to indicate that the first predetermined location and the second predetermined location of the any PRB have an offset of N PRBs, where N is greater than or equal to 0; or
  the location information is used to indicate that the first predetermined location and the second predetermined location of the any PRB have an offset of M number of subcarrier spacings, where N is greater than or equal to 0.

In a possible implementation, the second predetermined location is a boundary location or a central location of the any PRB.

In a possible implementation, the first predetermined location is any one of the following:
  a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

In a possible implementation, the processing unit 1902 is further configured to:
  after determining the second predetermined location of the any PRB based on the first predetermined location and the location information, when the network device schedules the terminal device in a location at a distance of Q PRBs from the any PRB, determine the location at the distance of Q PRBs from the any PRB based on the second predetermined location and a width of one PRB, where Q is an integer greater than or equal to 0, and the width of the PRB is equal to a product of the first subcarrier spacing and a quantity of subcarriers included in the PRB.

In a possible implementation, the processing unit 1902 is further configured to:
  after determining the second predetermined location of the any PRB based on the first predetermined location and the location information, determine a location of a PRB in a system common PRB grid with a second subcarrier spacing based on the second predetermined location of the any PRB in the system common PRB grid with the first subcarrier spacing, where the second subcarrier spacing and the first subcarrier spacing are different, and the system common PRB grid with the first subcarrier spacing and the system common PRB grid with the second subcarrier spacing belong to a same system bandwidth.

It should be noted that, division of the units in this embodiment of this application is an example and is merely logical function division, and there may be another division manner during actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 20:
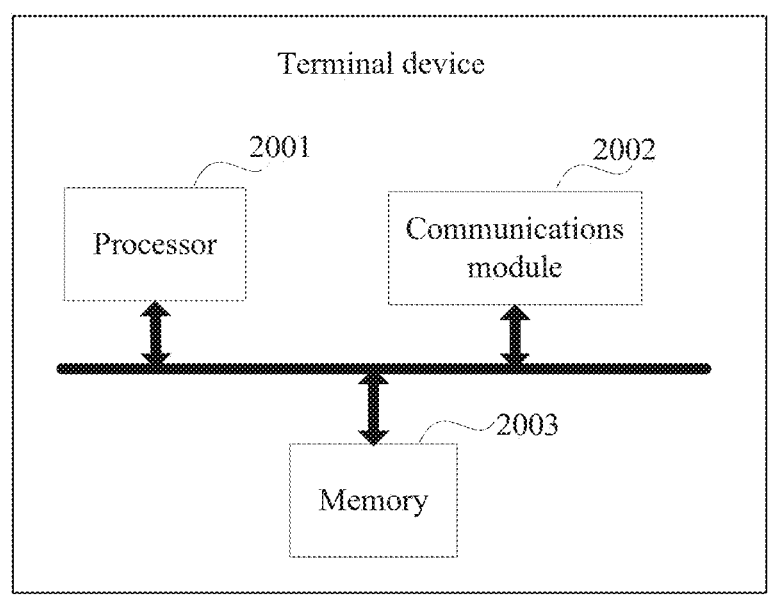
FIG. 20 is a schematic structural diagram of a second terminal device according to an embodiment of this application.

Based on a same inventive concept, an embodiment of this application further provides a terminal device. The terminal device uses the method performed by the terminal device in the method provided in the embodiment corresponding to FIG. 10, and may be the same device as the terminal device shown in FIG. 19. Referring to FIG. 20, the terminal device includes a processor 2001, a communications module 2002, and a memory 2003.

The processor 2001 is configured to read a program in the memory 2003 to perform the following processes:

receiving, by the processor 2001 by using the communications module 2002, location information sent by a network device, where the location information is used to indicate a relative location relationship between a first predetermined location in a synchronization signal block PRB grid and any PRB in a system common PRB grid with a first subcarrier spacing; and determining, by the processor 2001, a second predetermined location of the any PRB based on the first predetermined location and the location information, where the second predetermined location is used to determine a location of a PRB included in the system common PRB grid.

The communications module 2002 includes a communications interface for sending and/or receiving data.

In a possible implementation, when receiving, by using the communications module 2002, the location information sent by the network device, the processor 2001 is specifically configured to:

receive, by using the communications module 2002, a broadcast message carried on a physical broadcast channel and sent by the network device, where the broadcast message carries the location information.

In a possible implementation, that the location information is used to indicate a relative location relationship between a first predetermined location in a synchronization signal block PRB grid and any PRB in a system common PRB grid with a first subcarrier spacing is specifically:

the location information is used to indicate that the first predetermined location and the second predetermined location of the any PRB have an offset of N PRBs, where N is greater than or equal to 0; or the location information is used to indicate that the first predetermined location and the second predetermined location of the any PRB have an offset of M number of subcarrier spacings, where N is greater than or equal to 0.

In a possible implementation, the second predetermined location is a boundary location or a central location of the any PRB.

In a possible implementation, the first predetermined location is any one of the following:

a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

In a possible implementation, the processor 2001 is further configured to:

after determining the second predetermined location of the any PRB based on the first predetermined location and the location information, when the network device schedules the terminal device in a location at a distance of Q PRBs from the any PRB, determine the location at the distance of Q PRBs from the any PRB based on the second predetermined location and a width of one PRB, where Q is an integer greater than or equal to 0, and the width of the PRB is equal to a product of the first subcarrier spacing and a quantity of subcarriers included in the PRB.

In a possible implementation, the processor 2001 is further configured to: after determining the second predetermined location of the any PRB based on the first predetermined location and the location information, determine a location of a PRB in a system common PRB grid with a second subcarrier spacing based on the second predetermined location of the any PRB in the system common PRB grid with the first subcarrier spacing, where the second subcarrier spacing and the first subcarrier spacing are different, and the system common PRB grid with the first subcarrier spacing and the system common PRB grid with the second subcarrier spacing belong to a same system bandwidth.

The processor 2001, the communications module 2002, and the memory 2003 are connected to each other by using a bus. The bus may be a peripheral component interconnect (PCI) bus, an extended industry standard architecture (EISA) bus, or the like. The bus may be categorized as an address bus, a data bus, a control bus, or the like.

In FIG. 20, a bus architecture may include any quantity of interconnected buses and bridges, which are specifically linked by using various circuits of one or more processors represented by the processor 2001 and a memory represented by the memory 2003. The bus architecture may further link various other circuits, such as peripheral devices, voltage stabilizers, and power management circuits. All this is well known in the art and therefore is not further described herein. A bus interface provides an interface. The communications module 2002 may be a plurality of components, that is, includes a transmitter and a communications module, providing a unit for communicating with various other apparatuses on a transmission medium. The processor 2001 is responsible for managing the bus architecture and general processing, and the memory 2003 can store data used by the processor 2001 in performing operations.

Optionally, the processor 2001 may be a central processing unit, an application-specific integrated circuit (ASIC), a field-programmable gate array (FPGA), or a complex programmable logical device (CPLD).

Figure 21:
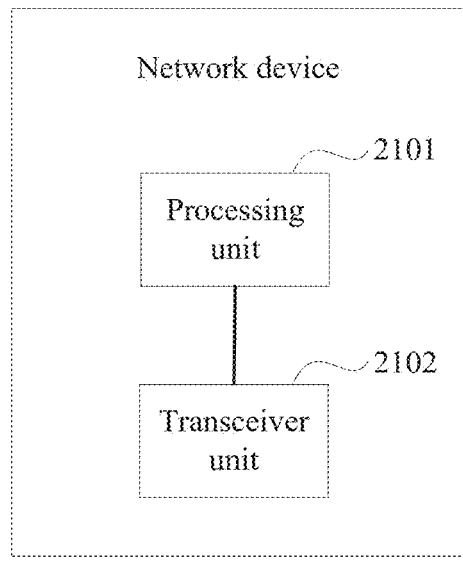
FIG. 21 is a schematic structural diagram of a network device according to an embodiment of this application.

Based on a same inventive concept, an embodiment of this application further provides a network device. The network device can implement the method performed by the network device in the method provided in the embodiment corresponding to FIG. 10. Referring to FIG. 21, the network device includes a processing unit 2101 and a transceiver unit 2102.

The processing unit 2101 is configured to send location information to a terminal device by using the transceiver unit 2102, where the location information is used to indicate a relative location relationship between a first predetermined location in a synchronization signal block PRB grid and any PRB in a system common PRB grid with a first subcarrier spacing, the first predetermined location and the location information are used by the terminal device to determine a second predetermined location of the any PRB, and the second predetermined location is used to determine a location of a PRB included in the system common PRB grid.

In a possible implementation, when sending the location information to the terminal device by using the transceiver unit 2102, the processing unit 2101 is specifically configured to: send, by using the transceiver unit 2102, a broadcast message carried on a physical broadcast channel to the terminal device, where the broadcast message carries the location information.

In a possible implementation, that the location information is used to indicate a relative location relationship between a first predetermined location in a synchronization signal block PRB grid and any PRB in a system common PRB grid with a first subcarrier spacing is specifically: the location information is used to indicate that the first predetermined location and the second predetermined location of the any PRB have an offset of N PRBs, where N is greater than or equal to 0; or the location information is used to indicate that the first predetermined location and the second predetermined location of the any PRB have an offset of M number of subcarrier spacings, where N is greater than or equal to 0.

In a possible implementation, the second predetermined location is a boundary location or a central location of the any PRB.

In a possible implementation, the first predetermined location is any one of the following: a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

It should be noted that, division of the units in this embodiment of this application is an example and is merely logical function division, and there may be another division manner during actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior aft, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

Figure 22:
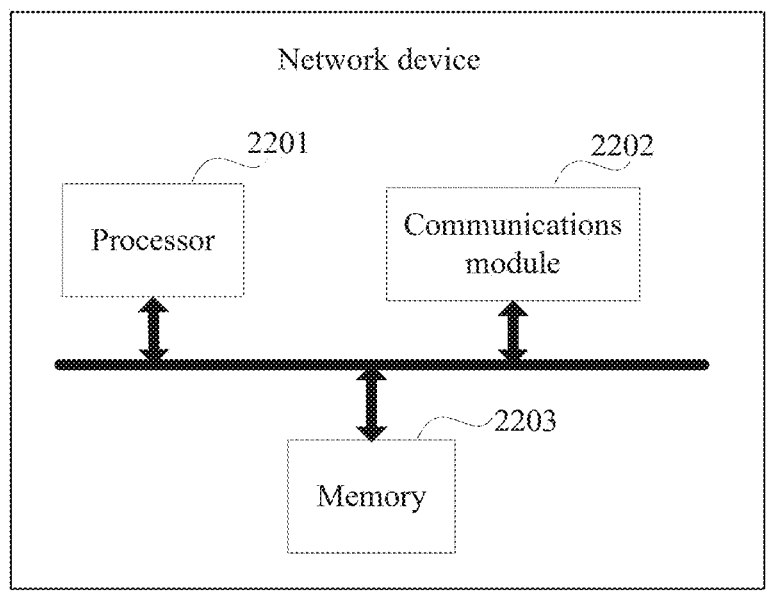
FIG. 22 is a schematic structural diagram of another network device according to an embodiment of this application.

Based on a same inventive concept, an embodiment of this application further provides a network device. The network device uses the method performed by the network device in the method provided in the embodiment corresponding to FIG. 10, and may be the same device as the network device shown in FIG. 21. Referring to FIG. 22, the network device includes a processor 2201, a communications module 2202, and a memory 2203.

The processor 2201 is configured to read a program in the memory 2203 to perform the following process: sending, by the processor 2201, location information to a terminal device by using the communications module 2202, where the location information is used to indicate a relative location relationship between a first predetermined location in a synchronization signal block PRB grid and any PRB in a system common PRB grid with a first subcarrier spacing, the first predetermined location and the location information are used by the terminal device to determine a second predetermined location of the any PRB, and the second predetermined location is used to determine a location of a PRB included in the system common PRB grid.

The communications module 2202 includes a communications interface for sending and/or receiving data.

In a possible implementation, when sending the location information to the terminal device by using the communications module 2202, the processor 2201 is specifically configured to: send, by using the communications module 2202, a broadcast message carried on a physical broadcast channel to the terminal device, where the broadcast message carries the location information.

In a possible implementation, that the location information is used to indicate a relative location relationship between a first predetermined location in a synchronization signal block PRB grid and any PRB in a system common PRB grid with a first subcarrier spacing is specifically: the location information is used to indicate that the first predetermined location and the second predetermined location of the any PRB have an offset of N PRBs, where N is greater than or equal to 0; or the location information is used to indicate that the first predetermined location and the second predetermined location of the any PRB have an offset of M number of subcarrier spacings, where N is greater than or equal to 0.

In a possible implementation, the second predetermined location is a boundary location or a central location of the any PRB.

In a possible implementation, the first predetermined location is any one of the following: a center frequency of the synchronization signal block PRB grid, a frequency corresponding to the first subcarrier of the synchronization signal block PRB grid, a carrier frequency location of a synchronization signal block corresponding to the synchronization signal block PRB grid, a center frequency corresponding to a subcarrier closest to the center frequency of the synchronization signal block PRB grid, and a frequency corresponding to the $145^{th}$ subcarrier of a physical channel corresponding to the synchronization signal block PRB grid.

The processor 2201, the communications module 2202, and the memory 2203 are connected to each other by using a bus. The bus may be a PCI bus, an EISA bus, or the like. The bus may be categorized as an address bus, a data bus, a control bus, or the like.

In FIG. 22, a bus architecture may include any quantity of interconnected buses and bridges, which are specifically linked by using various circuits of one or more processors represented by the processor 2201 and a memory represented by the memory 2203. The bus architecture may further link various other circuits, such as peripheral devices, voltage stabilizers, and power management circuits. All this is well known in the art and therefore is not further described herein. A bus interface provides an interface. The communications module 2202 may be a plurality of components, that is, includes a transmitter and a communications module, providing a unit for communicating with various other apparatuses on a transmission medium. The processor 2201 is responsible for managing the bus architecture and general processing, and the memory 2203 can store data used by the processor 2201 in performing operations.

Optionally, the processor 2201 may be a central processing unit, an ASIC, an FPGA, or a CPLD.

Figure 23:
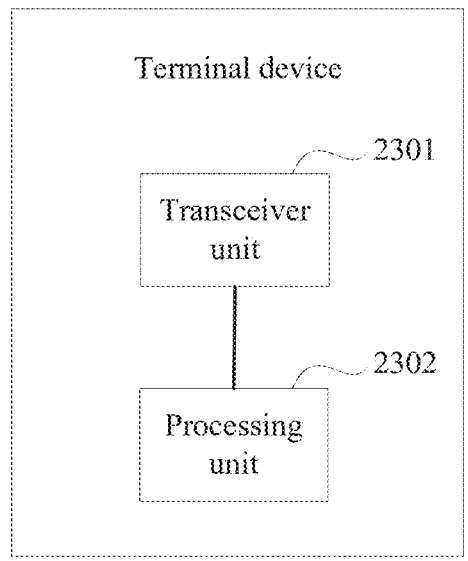
FIG. 23 is a schematic structural diagram of a third terminal device according to an embodiment of this application.

Based on a same inventive concept, an embodiment of this application further provides a terminal device. The terminal device can implement the method performed by the terminal device in the method provided in the embodiment corresponding to FIG. 10. Referring to FIG. 23, the terminal device includes a transceiver unit 2301 and a processing unit 2302.

The transceiver unit 2301 is configured to receive scheduling information sent by a network device, where the scheduling information is used by the network device to schedule the terminal device on a specified PRB, and the specified PRB is a PRB in a system common PRB grid with a subcarrier spacing in a system bandwidth.

The processing unit 2302 is configured to determine a location of the specified PRB based on predetermined information, where the predetermined information is used to indicate system common PRB grids with different subcarrier spacings in one of at least one system bandwidth.

In a possible implementation, that the predetermined information is used to indicate system common PRB grids with different subcarrier spacings in any system bandwidth in at least one system bandwidth is specifically: the predetermined information is used to indicate a location of a PRB in the system common PRB grids with the different subcarrier spacings in the any one of the at least one system bandwidth; or the predetermined information is used to indicate a location of a PRB in a first system common PRB grid and a relative location relationship between the first system common PRB grid and a second system common PRB grid, where the first system common PRB grid and the second system common PRB grid belong to a same system bandwidth in the at least one system bandwidth, and a subcarrier spacing of the first system common PRB grid and a subcarrier spacing of the second system common PRB grid are different.

It should be noted that, division of the units in this embodiment of this application is an example and is merely logical function division, and there may be another division manner during actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior aft, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

Figure 24:
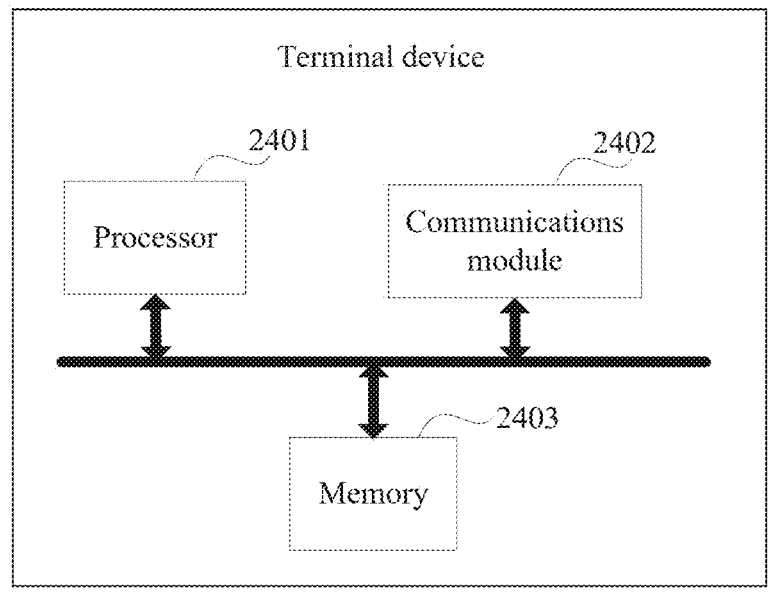
FIG. 24 is a schematic structural diagram of a fourth terminal device according to an embodiment of this application.

Based on a same inventive concept, an embodiment of this application further provides a terminal device. The terminal device uses the method performed by the terminal device in the method provided in the embodiment corresponding to FIG. 10, and may be the same device as the terminal device shown in FIG. 24. Referring to FIG. 24, the terminal device includes a processor 2401, a communications module 2402, and a memory 2403.

The processor 2401 is configured to read a program in the memory 2403 to perform the following processes: receiving, by the processor 2401 by using the communications module 2402, scheduling information sent by a network device, where the scheduling information is used by the network device to schedule the terminal device on a specified PRB, where the specified PRB is a PRB in a system common PRB grid with a subcarrier spacing in a system bandwidth; and determining, by the processor 2401, a location of the specified PRB based on predetermined information, where the predetermined information is used to indicate system common PRB grids with different subcarrier spacings in any one of at least one system bandwidth.

In a possible implementation, that the predetermined information is used to indicate system common PRB grids with different subcarrier spacings in any one of at least one system bandwidth is specifically: the predetermined information is used to indicate a location of a PRB in the system common PRB grids with the different subcarrier spacings in the any one of the at least one system bandwidth; or the predetermined information is used to indicate a location of a PRB in a first system common PRB grid and a relative location relationship between the first system common PRB grid and a second system common PRB grid, where the first system common PRB grid and the second system common PRB grid belong to a same system bandwidth in the at least one system bandwidth, and a subcarrier spacing of the first system common PRB grid and a subcarrier spacing of the second system common PRB grid are different.

The processor 2401, the communications module 2402, and the memory 2403 are connected to each other by using a bus. The bus may be a PCI bus, an EISA bus, or the like. The bus may be categorized as an address bus, a data bus, a control bus, or the like.

In FIG. 24, a bus architecture may include any quantity of interconnected buses and bridges, which are specifically linked by using various circuits of one or more processors represented by the processor 2401 and a memory represented by the memory 2403. The bus architecture may further link various other circuits, such as peripheral devices, voltage stabilizers, and power management circuits. All this is well known in the art and therefore is not further described herein. A bus interface provides an interface. The communications module 2402 may be a plurality of components, that is, includes a transmitter and a communications module, providing a unit for communicating with various other apparatuses on a transmission medium. The processor 2401 is responsible for managing the bus architecture and general processing, and the memory 2403 can store data used by the processor 2401 in performing operations.

Optionally, the processor 2401 may be a central processing unit, an ASIC, an FPGA, or a CPLD.

An embodiment of this application further provides a PRB grid indication apparatus, and the apparatus includes a chip. The chip is configured to perform the method performed by the terminal device in the foregoing PRB grid indication method, and the chip performs, by using a transceiver (or a communications module), a method for sending and/or receiving data by the terminal device in the foregoing PRB grid indication method. Alternatively, the chip is configured to perform the method performed by the network device in the foregoing PRB grid indication method, and the chip performs, by using a transceiver (or a communications module), a method for sending and/or receiving data by the network device in the foregoing PRB grid indication method.

An embodiment of this application provides a computer program product including an instruction. When running on a computer, the computer program product enables the computer to perform the PRB grid indication method performed by the terminal device in the foregoing embodiment, or enables the computer to perform the PRB grid indication method performed by the network device in the foregoing embodiment.

Figure 25:
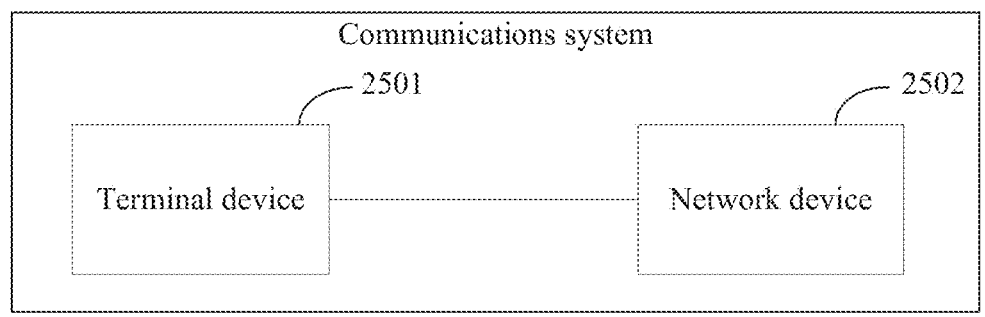
FIG. 25 is a schematic structural diagram of a communications system according to an embodiment of this application.

Based on a same inventive concept, an embodiment of this application further provides a communications system. As shown in FIG. 25, the communications system includes a terminal device 2501 and a network device 2502. The terminal device 2501 is configured to perform the method performed by the terminal device in the method provided in the embodiment corresponding to FIG. 10, and the terminal device 2501 may be the same device as the terminal device shown in FIG. 19 or FIG. 20, or may be the same device as the terminal device shown in FIG. 23 or FIG. 24. The network device 2502 is configured to perform the method performed by the network device in the method provided in the embodiment corresponding to FIG. 10, and the network device 2502 may be the same device as the network device shown in FIG. 21 or FIG. 22. The PRB grid indication method provided in the embodiments of this application can be implemented by using the communications system.

An embodiment of this application further provides a structure of a synchronization signal block, and the structure of the synchronization signal block can be applied to any embodiment or implementation of the foregoing method and apparatus embodiments. The structure of the synchronization signal block may have a plurality of implementations.

In a possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, at least one of the first subcarrier carrying a synchronization sequence modulation signal in the primary synchronization signal and the first subcarrier carrying a synchronization sequence modulation signal in the secondary synchronization signal has the same frequency as or is aligned with the first subcarrier carrying a physical broadcast channel modulation signal in the physical broadcast channel. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

Figure 29:
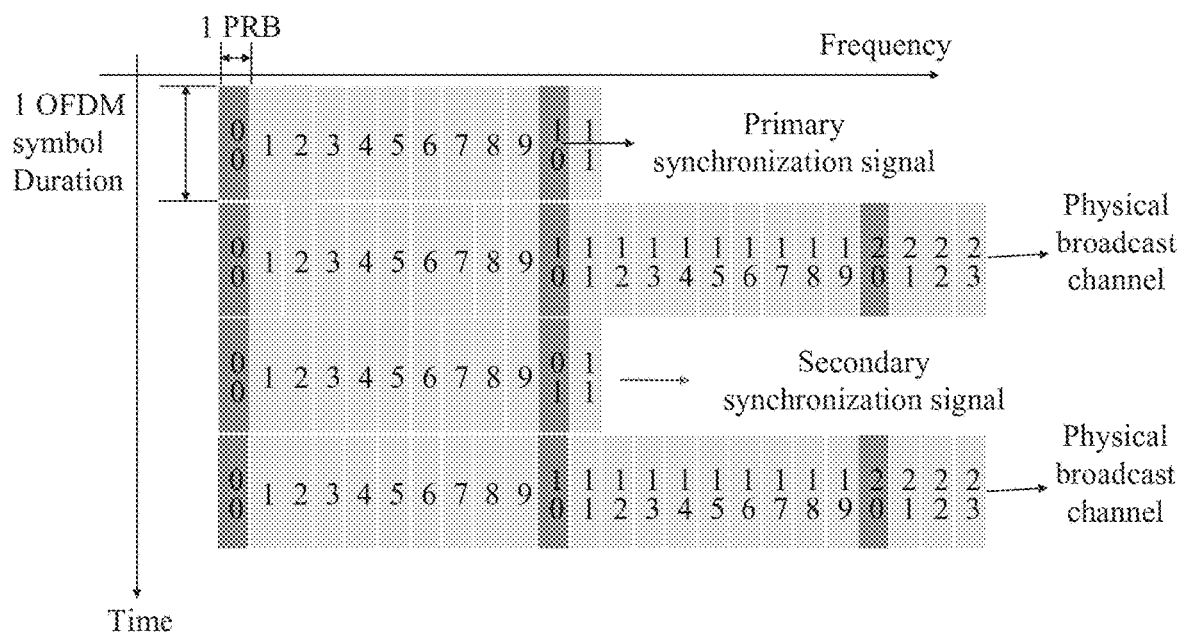
FIG. 29 to FIG. 33 are schematic diagrams of a signal structure of a synchronization signal block according to an embodiment of this application.

A structure of a synchronization signal block shown in FIG. 29 is used as an example. FIG. 29 includes four rows of PRB grids. For the structure of the synchronization signal block shown in FIG. 29, in this embodiment, a primary synchronization signal and a secondary synchronization signal each include 12 consecutive PRBs in frequency domain, and a physical broadcast channel includes 24 consecutive PRBs in frequency domain. A left boundary of the first PRB of the primary synchronization signal and a left boundary of the first PRB of the secondary synchronization signal each are aligned with a left boundary of the first PRB of the physical broadcast channel in frequency domain. In other words, the first subcarrier of the primary synchronization signal and the first subcarrier of the secondary synchronization signal each have the same frequency as the first subcarrier of the physical broadcast channel.

In another possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, at least one of the last subcarrier carrying a synchronization sequence modulation signal in the primary synchronization signal and the last subcarrier carrying a synchronization sequence modulation signal in the secondary primary synchronization signal has the same frequency as or is aligned with the last subcarrier carrying a physical broadcast channel modulation signal in the physical broadcast channel; or in frequency domain, at least one of the first subcarrier carrying a synchronization sequence modulation signal in the primary synchronization signal and the first subcarrier carrying the synchronization sequence modulation signal in the secondary synchronization signal has the same frequency as or is aligned with the $145^{th}$ subcarrier carrying a physical broadcast channel modulation signal in the physical broadcast channel. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

Figure 30:
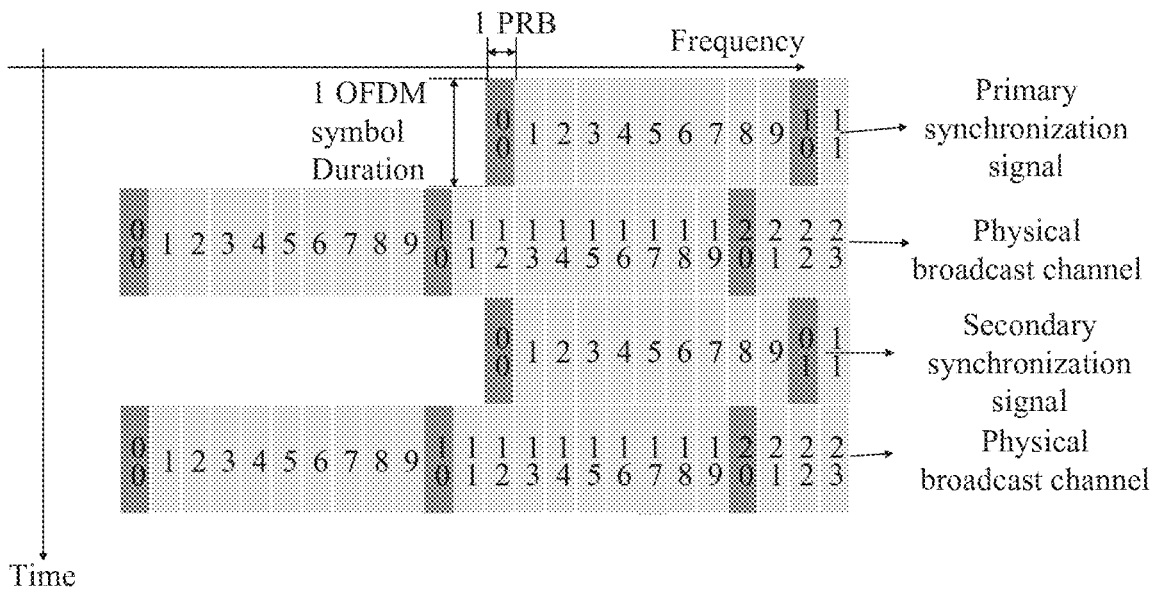

A structure of a synchronization signal block shown in FIG. 30 is used as an example. FIG. 30 includes four rows of PRB grids. For the structure of the synchronization signal block shown in FIG. 30, in this embodiment, a primary synchronization signal and a secondary synchronization signal each include 12 consecutive PRBs in frequency domain, and a physical broadcast channel includes 24 consecutive PRBs in frequency domain. A left boundary of the first PRB of the primary synchronization signal and a left boundary of the first PRB of the secondary synchronization signal each are aligned with a left boundary of the thirteenth PRB of the physical broadcast channel in frequency domain. In other words, the first subcarrier of the primary synchronization signal and the first subcarrier of the secondary synchronization signal each have the same frequency as the $145^{th}$ subcarrier of the physical broadcast channel.

In another possible implementation, the synchronization signal block includes a primary synchronization signal, a secondary synchronization signal, and a physical broadcast channel. A quantity of subcarriers carrying a synchronization sequence modulation signal in the primary synchronization signal and a quantity of subcarriers carrying a physical broadcast channel modulation signal in the physical broadcast channel are different, and a quantity of subcarriers carrying a synchronization sequence modulation signal in the secondary synchronization signal and the quantity of subcarriers carrying a physical broadcast channel modulation signal in the physical broadcast channel are different. In frequency domain, the first subcarrier carrying a physical broadcast channel modulation signal and at least one of the first subcarrier carrying a synchronization sequence modulation signal in the primary synchronization signal and the first subcarrier carrying a synchronization sequence modulation signal in the secondary synchronization signal have a fifth offset value in frequency, where the fifth offset value is an integer multiple of a PRB, and is not 6 PRBs; or in frequency domain, the last subcarrier carrying a physical broadcast channel modulation signal in the physical broadcast channel and at least one of the last subcarrier carrying a synchronization sequence modulation signal in the primary synchronization signal and the last subcarrier carrying a synchronization sequence modulation signal in the secondary synchronization signal have a fifth offset value in frequency, where the fifth offset value is an integer multiple of a PRB, and is not 6 PRBs. Optionally, a physical resource block grid of the synchronization signal block includes 24 PRBs, and the 24 PRBs occupy a plurality of OFDM symbols in time domain. Quantities of subcarriers carrying a synchronization sequence modulation signal in the primary synchronization signal and the secondary synchronization signal are 144 each. The quantity of subcarriers carrying a physical broadcast channel modulation signal in the physical broadcast channel is 288.

Figure 31:
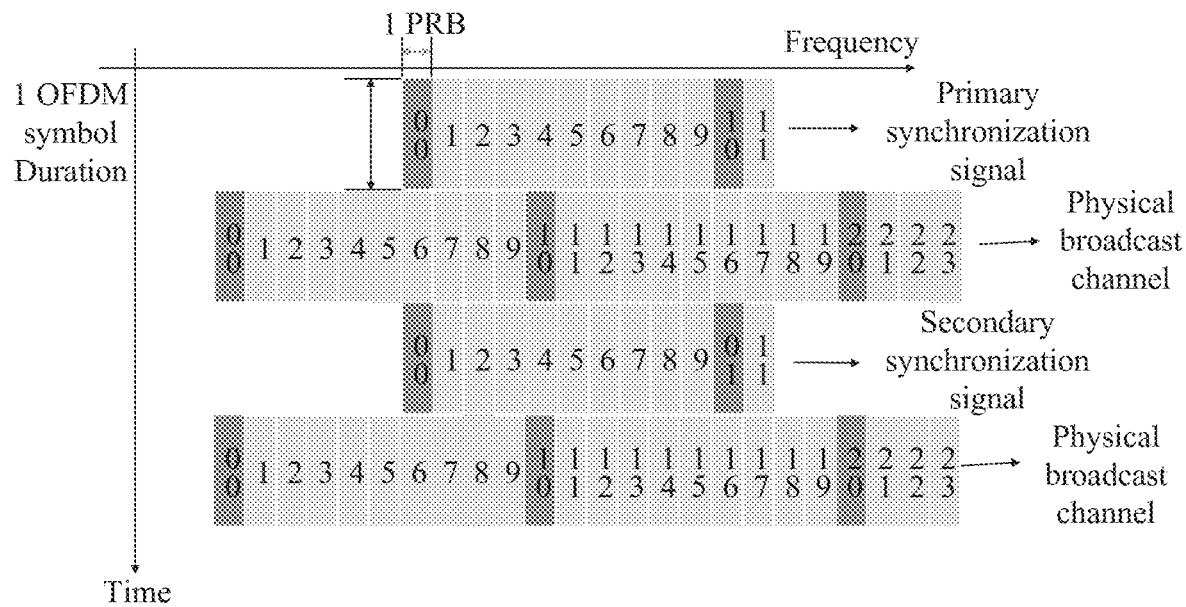

A structure of a synchronization signal block shown in FIG. 31 is used as an example. FIG. 31 includes four rows of PRB grids. For the structure of the synchronization signal block shown in FIG. 31, in this embodiment, a primary synchronization signal and a secondary synchronization signal each include 12 consecutive PRBs in frequency domain, and a physical broadcast channel includes 24 consecutive PRBs in frequency domain. A left boundary of the first PRB of the primary synchronization signal and a left boundary of the first PRB of the secondary synchronization signal each are aligned with a left boundary of the fourth PRB of the physical broadcast channel in frequency domain. In other words, the first subcarrier of the primary synchronization signal and the first subcarrier of the secondary synchronization signal each have the same frequency as or are aligned with the $37^{th}$ subcarrier of the physical broadcast channel.

In another possible implementation, the synchronization signal block includes a primary synchronization signal, a secondary synchronization signal, and a physical broadcast channel, and a physical resource block grid of the synchronization signal block includes A PRBs. A quantity of subcarriers carrying a synchronization sequence modulation signal in the primary synchronization signal is B, a quantity of subcarriers carrying a synchronization sequence modulation signal in the secondary synchronization signal is B, and a quantity of subcarriers carrying a physical broadcast channel modulation signal in the physical broadcast channel signal is C, where A, B, and C are positive integers, and B is not equal to C. In frequency domain, at least one of the first subcarrier carrying a synchronization sequence modulation signal in the primary synchronization signal and the first subcarrier carrying a synchronization sequence modulation signal in the secondary synchronization signal has the same frequency as or is aligned with the $D^{th}$ subcarrier carrying a physical broadcast channel modulation signal in the physical broadcast channel, where D is an integer greater than or equal to 1 and less than or equal to C−B+1, but is not equal to 73, or D is an integer greater than or equal to 1 and less than or equal to C−B+1, and is an integer multiple of 12 plus 1 but not equal to 73. Optionally, the A PRBs occupy a plurality of OFDM symbols in time domain.

In another possible implementation, the synchronization signal block includes a primary synchronization signal, a secondary synchronization signal, and a physical broadcast channel, and a physical resource block grid of the synchronization signal block includes A PRBs. The synchronization signal block occupies a plurality of OFDM symbols in time domain, the second and the third OFDM symbols of the synchronization signal block are nonconsecutive, and a distance between the second and the third symbols is one OFDM symbol. Optionally, the A PRBs occupy a plurality of OFDM symbols in time domain.

Figure 32:
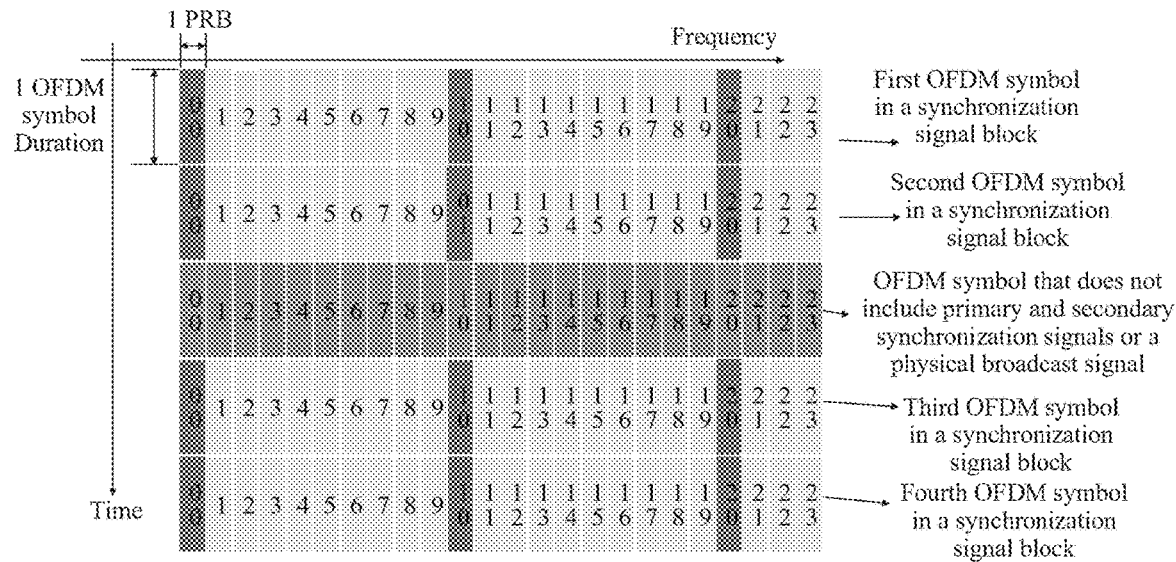

A structure of a synchronization signal block shown in FIG. 32 is used as an example. FIG. 32 includes five rows of PRB grids. For the structure of the synchronization signal block shown in FIG. 32, a physical resource block grid of the synchronization signal block in this embodiment includes 24 PRBs. The 24 PRBs occupy a plurality of OFDM symbols in time domain, the second and the third OFDM symbols of the synchronization signal block are nonconsecutive, and a distance between the second and the third symbols is one OFDM symbol.

In another possible implementation, the synchronization signal block includes a primary synchronization signal, a secondary synchronization signal, and a physical broadcast channel, and a physical resource block grid of the synchronization signal block includes A PRBs. The synchronization signal block occupies a plurality of OFDM symbols in time domain, the third and the fourth OFDM symbols of the synchronization signal block are nonconsecutive, and a distance between the third and the fourth symbols is one OFDM symbol. Optionally, the A PRBs occupy a plurality of OFDM symbols in time domain.

Figure 33:
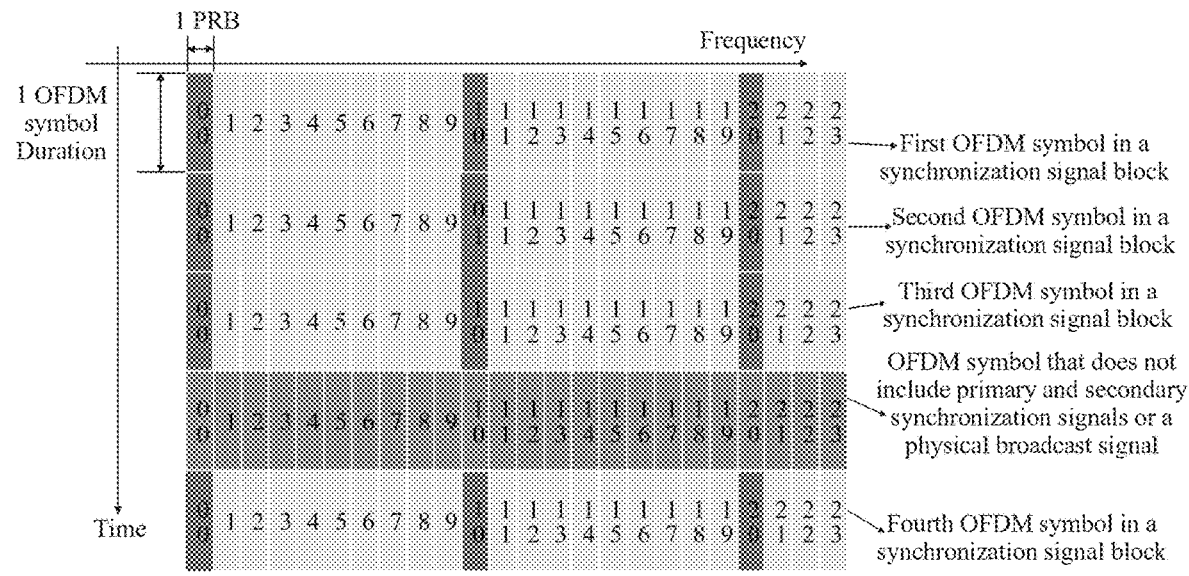

A structure of a synchronization signal block shown in FIG. 33 is used as an example. FIG. 33 includes five rows of PRB grids. For the structure of the synchronization signal block shown in FIG. 33, a physical resource block grid of the synchronization signal block in this embodiment includes 24 PRBs. The 24 PRBs occupy a plurality of OFDM symbols in time domain, the third and the fourth OFDM symbols of the synchronization signal block are nonconsecutive, and a distance between the third and the fourth symbols is one OFDM symbol.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In some embodiments, a method for wireless communication comprises receiving, from a network device, a broadcast message carrying location information, the location information indicating a relative location relationship between a second location of a physical resource block (PRB) in a system common PRB grid with a first subcarrier spacing and a first location in a synchronization signal block PRB grid, the first location corresponding to the 1st subcarrier of the synchronization signal block PRB grid; and obtaining the location information from the broadcast message.

In some examples of the method, the method further comprises determining the second location of the PRB in the system common PRB grid based on the first location and the location information.

In some examples of the method, the location information indicates that a first offset between the first location and the second location is a quantity of M number of subcarrier spacings, wherein M is greater than or equal to 0.

In some examples of the method, M is a value of a preset value set, and the preset value set is {0, 1, 2, 3, 4, 5, 6, 7, 8, 9, 10, 11, 12, 13, 14, 15, 16, 17, 18, 19, 20, 21, 22, 23}.

In some examples of the method, M is a value of a preset value set, and the preset value set is {0, 1, 2, 3, 4, 5, 6, 7, 8, 9, 10, 11}.

In some examples of the method, the second location is a boundary location or a central location of the PRB.

In some examples of the method, the central location is the 7th subcarrier of the PRB, and the boundary location is the 1st subcarrier of the PRB or the 12th subcarrier of the PRB.

In some examples of the method, the first subcarrier spacing is 15 kHz or 60 kHz.

In some examples of the method, a synchronization signal block corresponding to the synchronization signal block PRB grid comprises a primary synchronization signal, a secondary synchronization signal, and a physical broadcast channel.

In some embodiments, an apparatus comprises a communications module configured to receive a broadcast message carrying location information from a network device, the location information indicating a relative location relationship between a second location of a physical resource block (PRB) in a system common PRB grid with a first subcarrier spacing and a first location in a synchronization signal block PRB grid, the first location corresponding to the 1st subcarrier of the synchronization signal block PRB grid; and at least one processor coupled to the communications module, with the at least one processor being configured to obtain the location information from the broadcast message.

In some examples of the apparatus, the at least one processor is further configured to determine the second location of the PRB in the system common PRB grid based on the first location and the location information.

In some examples of the apparatus, the location information indicates that a first offset between the first location and the second location is a quantity of M number of subcarrier spacings, wherein M is greater than or equal to 0.

In some examples of the apparatus, the location information indicates that a second offset between the first location and the second location is a quantity of M number of subcarrier spacings plus a quantity of N PRBs, wherein M and N is greater than or equal to 0.

In some examples of the apparatus, the PRB is the 1st PRB in a control resource set.

In some examples of the apparatus, M is a value of a preset value set, and the preset
value set is {0, 1, 2, 3, 4, 5, 6, 7, 8, 9, 10, 11, 12, 13, 14, 15, 16, 17, 18, 19, 20, 21, 22, 23}.

In some examples of the apparatus, M is a value of a preset value set, and the preset value set is {0, 1, 2, 3, 4, 5, 6, 7, 8, 9, 10, 11}.

In some examples of the apparatus, M is a value of a preset value set, and the preset value set is {0, 1, 2, 3, 4, 5, 6, 7, 8, 9, 10, 11, 12, 13, 14, 15, 16, 17, 18, 19, 20, 21, 22, 23}.

In some examples of the apparatus, M is a value of a preset value set, and the preset value set is {0, 1, 2, 3, 4, 5, 6, 7, 8, 9, 10, 11}.

In some examples of the apparatus, the second location is a boundary location or a central location of the PRB.

In some examples of the apparatus, the central location is the 7th subcarrier of the PRB, and the boundary location is the 1st subcarrier of the PRB or the 12th subcarrier of the PRB.

In some examples of the apparatus, the first subcarrier spacing is 15 kHz. In other examples, the first subcarrier spacing is 60 kHz.

In some examples of the apparatus, a synchronization signal block corresponding to the synchronization signal block PRB grid comprises a primary synchronization signal, a secondary synchronization signal, and a physical broadcast channel.

In some examples of the apparatus, the communications module comprises an interface or a receiver.

In some examples of the apparatus, the apparatus is a chip.

In some examples of the apparatus, the apparatus is a terminal device.

In some embodiments, a non-transitory computer readable medium comprises a computer program, wherein when running on a computer, the computer program enables the computer to perform the following steps: receiving, from a network device, a broadcast message carrying location information, the location information indicating a relative location relationship between a second location of a physical resource block (PRB) in a system common PRB grid with a first subcarrier spacing and a first location in a synchronization signal block PRB grid, the first location corresponding to the 1st subcarrier of the synchronization signal block PRB grid; and obtaining the location information from the broadcast message.

In some examples of the computer readable medium, the location information indicates that a first offset between the first location and the second location is a quantity of M number of subcarrier spacings, wherein M is greater than or equal to 0.

What is claimed is:

1. A method, applied in a communication system including a network device and a terminal device communicating with the network device, comprising:
    obtaining, by the network device, location information, wherein the location information indicates an offset between a second location in a physical resource block (PRB) in a system common PRB grid and a first location in a synchronization signal block, the system common PRB grid having a first subcarrier spacing, the first location being a beginning subcarrier of the synchronization signal block and the first location overlapping with the PRB in the system common PRB grid, and the second location being a boundary location of the PRB in the system common PRB grid;
    sending, by the network device, the location information via a physical broadcast channel; and
    receiving, by the terminal device, the location information via the physical broadcast channel.

2. The method according to claim 1, wherein a value of the offset is M indicating an offset of M subcarriers between the first location and the second location, M being an integer larger than or equal to 0.

3. The method according to claim 2, wherein M is a value of a preset value set, the preset value set being {0, 1, 2, 3, 4, 5, 6, 7, 8, 9, 10, 11, 12, 13, 14, 15, 16, 17, 18, 19, 21, 22, 23}.

4. The method according to claim 2, wherein M is a value of a preset value set, the preset value set being {0, 1, 2, 3, 4, 5, 6, 7, 8, 9, 10, 11}.

5. The method according to claim 2, wherein M is a value of a preset value set, the preset value set being {0, 2, 4, 6, 8, 10, 12, 14, 16, 18, 20, 22}, or, {0, 2, 4, 6, 8, 10}.

6. The method according to claim 1, wherein the location information occupies 5 bits of the physical broadcast channel.

7. The method according to claim 1, wherein the boundary location of the PRB is a left boundary location of the PRB, being a beginning subcarrier of the PRB.

8. The method according to claim 2, wherein the first subcarrier spacing is 15 kHz or 30 kHz, and M is a value of a preset value set, the preset value set being {0, 1, 2, 3, 4, 5, 6, 7, 8, 9, 10, 11, 12, 13, 14, 15, 16, 17, 18, 19, 20, 21, 22, 23}.

9. The method according to claim 2, wherein the first subcarrier spacing is 60 kHz or 120 kHz, and M is a value of a preset value set, the preset value set being {0, 1, 2, 3, 4, 5, 6, 7, 8, 9, 10, 11}.

10. The method according to claim 2, wherein a subcarrier spacing of the M subcarriers is 15 kHz.

11. The method according to claim 1, wherein the PRB comprises twelve subcarriers.

12. The method according to claim 1, wherein the synchronization signal block comprises a primary synchronization signal, a secondary synchronization signal, and the physical broadcast channel.

13. An apparatus, comprising:
    a non-transitory memory, wherein the non-transitory memory stores a program; and
    a processor in communication with the non-transitory memory, wherein the processor is configured to execute the program to cause the apparatus to:
        obtain a signal carrying location information, wherein the location information indicates an offset between a second location in a physical resource block (PRB) in a system common PRB grid and a first location in a synchronization signal block, the system common PRB grid having a first subcarrier spacing, the first location being a beginning subcarrier of the synchronization signal block and the first location overlapping with the PRB, and the second location being a boundary location of the PRB in the system common PRB grid, and wherein the synchronization signal block comprises a primary synchronization signal, a secondary synchronization signal, and a physical broadcast channel; and
        send the signal.

14. The apparatus according to claim 13, wherein a value of the offset is M indicating an offset of M subcarriers between the first location and the second location, M being an integer larger than or equal to 0.

15. The apparatus according to claim 14, wherein M is a value of a preset value set, the preset value set being {0, 1, 2, 3, 4, 5, 6, 7, 8, 9, 10, 11, 12, 13, 14, 15, 16, 17, 18, 19, 20, 21, 22, 23}.

16. The apparatus according to claim 14, wherein M is a value of a preset value set, the preset value set being {0, 1, 2, 3, 4, 5, 6, 7, 8, 9, 10, 11}.

17. The apparatus according to claim 14, wherein M is a value of a preset value set, the preset value set being {0, 2, 4, 6, 8, 10, 12, 14, 16, 18, 20, 22}, or, {0, 2, 4, 6, 8, 10}.

18. The apparatus according to claim 13, wherein the signal is sent via the physical broadcast channel and the location information occupies 5 bits of the physical broadcast channel.

19. The apparatus according to claim 13, wherein the boundary location of the PRB is a left boundary location of the PRB, being a beginning subcarrier of the PRB.

20. The apparatus according to claim 14, wherein the first subcarrier spacing is 15 kHz or 30 kHz, and M is a value of a preset value set, the preset value set being {0, 1, 2, 3, 4, 5, 6, 7, 8, 9, 10, 11, 12, 13, 14, 15, 16, 17, 18, 19, 20, 21, 22, 23}.

21. The apparatus according to claim 14, wherein the first subcarrier spacing is 60 kHz or 120 kHz, and M is a value of a preset value set, the preset value set being {0, 1, 2, 3, 4, 5, 6, 7, 8, 9, 10, 11}.

22. The apparatus according to claim 14, wherein a subcarrier spacing of the M subcarriers is 15 kHz.

23. An apparatus, comprising:
    a processor and a communicating circuit, wherein the processor is configured to execute a program to cause the apparatus to:
        receive a physical broadcast channel through the communicating circuit; and
        obtain location information carried on the physical broadcast channel, wherein the location information indicates an offset between a second location in a physical resource block (PRB) in a system common PRB grid and a first location in a synchronization signal block, the system common PRB grid having a first subcarrier spacing, the first location being a beginning subcarrier of the synchronization signal block and the first location overlapping with the PRB, and the second location being a boundary location of the PRB in the system common PRB grid; and wherein the synchronization signal block comprises a primary synchronization signal, a secondary synchronization signal, and the physical broadcast channel.

24. The apparatus according to claim 23, wherein a value of the offset is M indicating an offset of M subcarriers between the first location and the second location, M being an integer larger than or equal to 0.

25. The apparatus according to claim 24, wherein M is a value of a preset value set, the preset value set being {0, 1, 2, 3, 4, 5, 6, 7, 8, 9, 10, 11, 12, 13, 14, 15, 16, 17, 18, 19, 20, 21, 22, 23}.

26. The apparatus according to claim 24, wherein M is a value of a preset value set, the preset value set being {0, 1, 2, 3, 4, 5, 6, 7, 8, 9, 10, 11}.

27. The apparatus according to claim 24, wherein M is a value of a preset value set, the preset value set being {0, 2, 4, 6, 8, 10, 12, 14, 16, 18, 20, 22}, or, {0, 2, 4, 6, 8, 10}.

28. The apparatus according to claim 23, wherein the location information occupies 5 bits of the physical broadcast channel.

29. The apparatus according to claim 23, wherein the boundary location of the PRB is a left boundary location of the PRB, being a beginning subcarrier of the PRB.

30. The apparatus according to claim 24, wherein the first subcarrier spacing is 15 kHz or 30 kHz, and M is a value of a preset value set, the preset value set being {0, 1, 2, 3, 4, 5, 6, 7, 8, 9, 10, 11, 12, 13, 14, 15, 16, 17, 18, 19, 20, 21, 22, 23}.

31. The apparatus according to claim 24, wherein the first subcarrier spacing is 60 kHz or 120 kHz, and M is a value of a preset value set, the preset value set being {0, 1, 2, 3, 4, 5, 6, 7, 8, 9, 10, 11}.

32. The apparatus according to claim 24, wherein a subcarrier spacing of the M subcarriers is 15 kHz.

33. The apparatus according to claim 23, wherein the apparatus is a terminal device, or, a chipset for the terminal device.

* * * * *

UNITED STATES PATENT AND TRADEMARK OFFICE
CERTIFICATE OF CORRECTION

PATENT NO. : 11,924,143 B2
APPLICATION NO. : 18/053515
DATED : March 5, 2024
INVENTOR(S) : Guo et al.

It is certified that error appears in the above-identified patent and that said Letters Patent is hereby corrected as shown below:

In the Specification

Column 11, Line 48; delete "no" and insert --110--.

Column 11, Line 49; delete "no" and insert --110--.

Column 11, Line 51; delete "1 in" and insert --1 lies in--.

Column 16, Line 21; delete "woo" and insert --1000--.

Column 16, Line 22; delete "low" and insert --1010--.

Column 16, Line 24; delete "moo" and insert --1000--.

Column 18, Line 4; delete "is 4," and insert --"is 0, 4,"--.

Column 18, Line 16; delete "4, 6," and insert --4, 5, 6,--.

Column 18, Line 21; delete "28, 32," and insert --28, 30, 32,--.

Column 18, Line 26; delete "}" and insert --{,--.

Column 18, Line 55; delete "on" and insert --011--.

Column 18, Line 59; delete "on" and insert --011--.

Column 18, Line 67; delete "}" and insert --},--.

Column 19, Line 3; delete "low" and insert --1010--.

Signed and Sealed this
Twenty-eighth Day of May, 2024

Katherine Kelly Vidal
*Director of the United States Patent and Trademark Office*

Column 33, Line 40; delete "aft" and insert --art--.

Column 35, Line 47; delete "aft" and insert --art--.

In the Claims

Claim 3, Column 43, Line 34; delete "19, 21," and insert --19, 20, 21,--.